US008772987B2

(12) United States Patent
Grimm et al.

(10) Patent No.: US 8,772,987 B2
(45) Date of Patent: Jul. 8, 2014

(54) SYNTHETIC JET EJECTOR AND DESIGN THEREOF TO FACILITATE MASS PRODUCTION

(75) Inventors: Daniel N. Grimm, Round Rock, TX (US); Stephen P. Darbin, Austin, TX (US); Andrew Poynot, Austin, TX (US)

(73) Assignee: Nuventix, Inc., Austin, TX (US)

( * ) Notice: Subject to any disclaimer, the term of this patent is extended or adjusted under 35 U.S.C. 154(b) by 754 days.

(21) Appl. No.: 13/026,220

(22) Filed: Feb. 12, 2011

(65) Prior Publication Data

US 2011/0198056 A1 Aug. 18, 2011

Related U.S. Application Data

(60) Provisional application No. 61/304,427, filed on Feb. 13, 2010.

(51) Int. Cl.
*H02K 33/12* (2006.01)
*H01R 13/66* (2006.01)
*F25D 15/00* (2006.01)
*B21D 53/02* (2006.01)

(52) U.S. Cl.
CPC ............... *F25D 15/00* (2013.01); *B21D 53/02* (2013.01)
USPC .................... 310/12.16; 381/401; 439/620.01

(58) Field of Classification Search
USPC .................... 310/12.16; 381/401; 439/620.01
See application file for complete search history.

(56) References Cited

U.S. PATENT DOCUMENTS

| 3,590,170 | A |   | 6/1971 | Sawyer et al. |
|-----------|---|---|--------|---------------|
| 4,584,438 | A | * | 4/1986 | Koenig ........................... 381/117 |
| 5,323,133 | A | * | 6/1994 | Heath et al. .................... 335/222 |
| 5,937,076 | A | * | 8/1999 | Tanabe et al. .................. 381/409 |

(Continued)

FOREIGN PATENT DOCUMENTS

WO    WO 2007040875 A2    4/2007

OTHER PUBLICATIONS

Search Report from corresponding PCT application dated May 5, 2011; PCT/US11/24665; 13 pages.

*Primary Examiner* — Burton Mullins
(74) *Attorney, Agent, or Firm* — John A. Fortkort; Fortkort & Houston P.C.

(57) ABSTRACT

A method is provided for making a synthetic jet ejector. The method comprises (a) providing first and second voice coil bodies (131) having first and second sets of channels defined therein, respectively; (b) inserting first and second sets of electrically conductive terminals (139) into the first and second sets of channels, respectively; (c) wrapping first and second coils of wire (151) around said first and second voice coil bodies, respectively, such that the first coil is in electrical contact with the first set of terminals and such that the second coil is in electrical contact with the second set of terminals; (d) forming a voice coil subassembly by attaching first and second ends of a flexible, electrically conductive connector (161) to said first and second voice coil bodies, respectively, wherein the first end of the connector is attached such that it is in electrical contact with the first set of terminals, and wherein the second end of the connector is attached such that it is in electrical contact with the second set of terminals; and (e) incorporating the voice coil subassembly into a synthetic jet ejector (103) having first and second voice coils such that said first coil forms a portion of said first voice coil, and such that said second coil forms a portion of said second voice coil.

24 Claims, 55 Drawing Sheets

(56) References Cited

U.S. PATENT DOCUMENTS

| | | |
|---|---|---|
| 6,542,617 B1 * | 4/2003 | Fujihira et al. ............... 381/402 |
| 6,590,163 B1 * | 7/2003 | Goto ............................ 174/135 |
| 6,853,734 B2 | 2/2005 | Sahyoun |
| 7,062,061 B2 * | 6/2006 | Suzuki .......................... 381/409 |
| 7,272,237 B2 | 9/2007 | Linn et al. |
| 7,460,682 B2 * | 12/2008 | Suzuki .......................... 381/410 |
| 7,502,487 B2 * | 3/2009 | Watanabe ..................... 381/409 |
| 8,638,976 B2 * | 1/2014 | Watanabe ..................... 381/400 |
| 2002/0081198 A1 | 6/2002 | Hassan et al. |
| 2007/0023169 A1 | 2/2007 | Mahalingam et al. |
| 2007/0081027 A1 | 4/2007 | Beltran et al. |
| 2007/0096118 A1 | 5/2007 | Mahalingam et al. |
| 2007/0119573 A1 | 5/2007 | Mahalingam et al. |
| 2007/0119575 A1 | 5/2007 | Glezer et al. |
| 2007/0127210 A1 | 6/2007 | Mahalingam et al. |
| 2007/0141453 A1 | 6/2007 | Mahalingam et al. |
| 2008/0043061 A1 | 2/2008 | Glezer et al. |

* cited by examiner

SYNTHETIC JET EJECTOR AND DESIGN THEREOF TO FACILITATE MASS PRODUCTION

CROSS-REFERENCE TO RELATED APPLICATION

This application claims the benefit of U.S. Provisional Application No. 61/304,427, filed Feb. 13, 2010.

FIELD OF THE DISCLOSURE

The present application relates to synthetic jet ejectors and synthetic jet actuators, and to methods for making the same.

BACKGROUND OF THE DISCLOSURE

A variety of thermal management devices are known to the art, including conventional fan based systems, piezoelectric systems, and synthetic jet actuators. The latter type of system has emerged as a highly efficient and versatile solution where thermal management is required at the local level. Frequently, synthetic jet actuators are utilized in conjunction with a conventional fan based system. In such hybrid systems, the fan based system provides a global flow of fluid through the device being cooled, and the synthetic jet ejectors provide localized cooling for hot spots and also augment the global flow of fluid through the device by perturbing boundary layers.

Various examples of synthetic jet ejectors and synthetic jet actuators are known to the art. Some examples include those disclosed in U.S. 20070141453 (Mahalingam et al.) entitled "Thermal Management of Batteries using Synthetic Jets"; U.S. 20070127210 (Mahalingam et al.), entitled "Thermal Management System for Distributed Heat Sources"; 20070119575 (Glezer et al.), entitled "Synthetic Jet Heat Pipe Thermal Management System"; 20070119573 (Mahalingam et al.), entitled "Synthetic Jet Ejector for the Thermal Management of PCI Cards"; 20070096118 (Mahalingam et al.), entitled "Synthetic Jet Cooling System for LED Module"; 20070081027 (Beltran et al.), entitled "Acoustic Resonator for Synthetic Jet Generation for Thermal Management"; and 20070023169 (Mahalingam et al.), entitled "Synthetic Jet Ejector for Augmentation of Pumped Liquid Loop Cooling and Enhancement of Pool and Flow Boiling".

SUMMARY OF THE INVENTION

Figure 1:
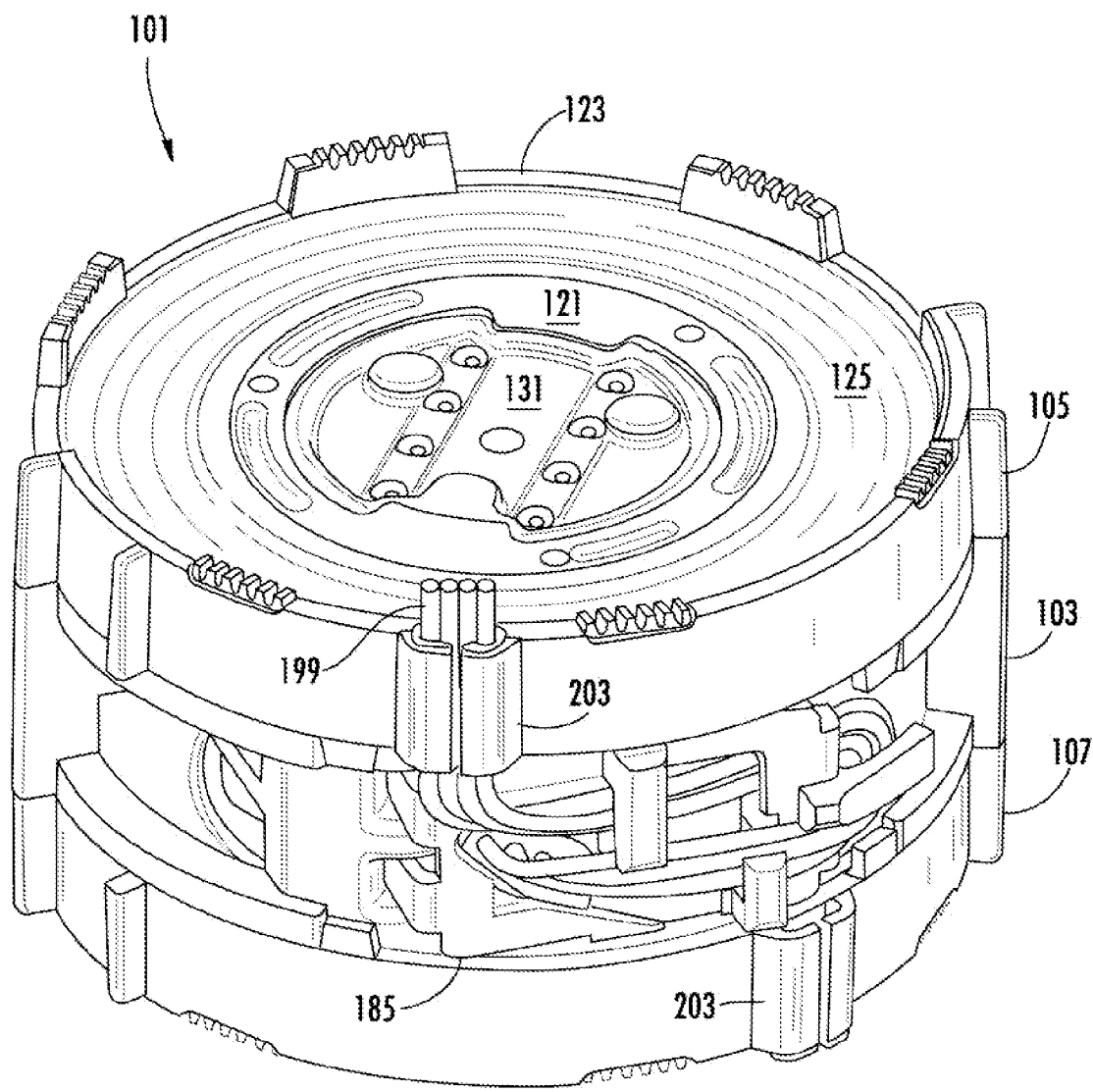
FIG. 1 is a perspective view of a synthetic jet actuator made in accordance with the teachings herein.

In one aspect, a method for making a synthetic jet ejector is provided, comprising (a) providing first and second voice coil bodies having first and second sets of channels defined therein, respectively; (b) inserting first and second sets of electrically conductive terminals into the first and second sets of channels, respectively; (c) wrapping first and second coils of wire around said first and second voice coil bodies, respectively, such that the first coil is in electrical contact with the first set of terminals and such that the second coil is in electrical contact with the second set of terminals; (d) forming a voice coil subassembly by attaching first and second ends of a flexible, electrically conductive connector to said first and second voice coil bodies, respectively, wherein the first end of the connector is attached such that it is in electrical contact with the first set of terminals, and wherein the second end of the connector is attached such that it is in electrical contact with the second set of terminals; and (e) incorporating the voice coil subassembly into a synthetic jet ejector having first and second voice coils such that said first coil forms a portion of said first voice coil, and such that said second coil forms a portion of said second voice coil.

In another aspect, a synthetic jet ejector is provided which comprises (a) first and second voice coil bodies having first and second sets of channels defined therein, respectively; (b) first and second sets of electrically conductive terminals disposed in the first and second sets of channels, respectively; (c) first and second coils of wire coiled around said first and second voice coil bodies, respectively, such that the first coil is in electrical contact with the first set of terminals and such that the second coil is in electrical contact with the second set of terminals; and (d) a flexible, electrically conductive connector having first and second ends attached to said first and second voice coil bodies, respectively, wherein the first end of the connector is attached such that it is in electrical contact with the first set of terminals, and wherein the second end of the connector is attached such that it is in electrical contact with the second set of terminals.

In another aspect, a method for making a synthetic jet ejector is provided which comprises (a) providing a first voice coil body having first and second channels defined therein; (b) inserting first and second electrically conductive terminals into the first and second channels, respectively, of the first voice coil body; (c) wrapping a first coil of wire around said first voice coil body such that a first end of the first coil is in electrical contact with the first terminal, and such that a second end of the first coil is in electrical contact with the second terminal; and (d) attaching a first end of a flexible, electrically conductive connector to said first voice coil body such that the first end of the connector is in electrical contact with the first and second terminals.

In yet another aspect, an electrical connector is provided for connecting first and second electromagnetic coils to an external power source. The connector comprises (a) a central portion having a semiconductor device disposed thereon which is adapted to control the operation of the first and second electromagnetic coils; and (b) first and second flexible arms depending from said central portion, wherein said first arm terminates in a first tab which releasably attaches to said first coil, and wherein said second arm terminates in a second tab which releasably attaches to said second coil.

DETAILED DESCRIPTION

Despite the many advantages of synthetic jet ejectors, a number of problems persist in the art with respect to these devices. In particular, the lack of methods for manufacturing synthetic jet ejectors and their components in large volumes and in a cost efficient manner remains an impediment to the commercial implementation of these devices. It is an added challenge to achieve the foregoing objectives without compromising the mechanical integrity of the resulting device. These problems may be addressed with the methodologies and devices disclosed herein.

With reference to FIGS. 1-7, a first particular, non-limiting embodiment of a synthetic jet actuator is depicted which is made in accordance with the teachings herein. The synthetic jet actuator 101 shown therein comprises a main chassis 103 (shown in greater detail in FIGS. 12-17 and FIGS. 41-45) having first 105 and second 107 auxiliary chassis components attached thereto. At least the structural portions of the main 103 chassis and auxiliary chassis 105, 107 components are preferably made out of a suitable plastic, preferably a moldable plastic, and even more preferably a thermoplastic, though in some applications, other materials such as thermosetting plastics, metals such as aluminum, copper and titanium, fiberglass, and various elastomers or rubbers may be used to form some or all of the structures of these components.

The auxiliary chassis components 105, 107 are shown in greater detail in FIGS. 46-49. They are preferably identical, though in some embodiments they may be mirror images of one another or may be otherwise different. The auxiliary chassis components 105, 107 may be permanently or releasably attached to the main chassis 103 with a suitable adhesive, through the application of heat, through one or more coupling elements disposed on the main chassis 103 or the auxiliary chassis components 105, 107 that permanently or releasably engage with each other or with suitable features provided on the other chassis or auxiliary components, or by other suitable means as are known to the art. The various other elements of a synthetic jet ejector incorporating the synthetic jet actuator 101 are attached to or housed within the main 103 and auxiliary chassis 105, 107 components, or are disposed within the housing of the synthetic jet ejector (not shown).

Figure 49:
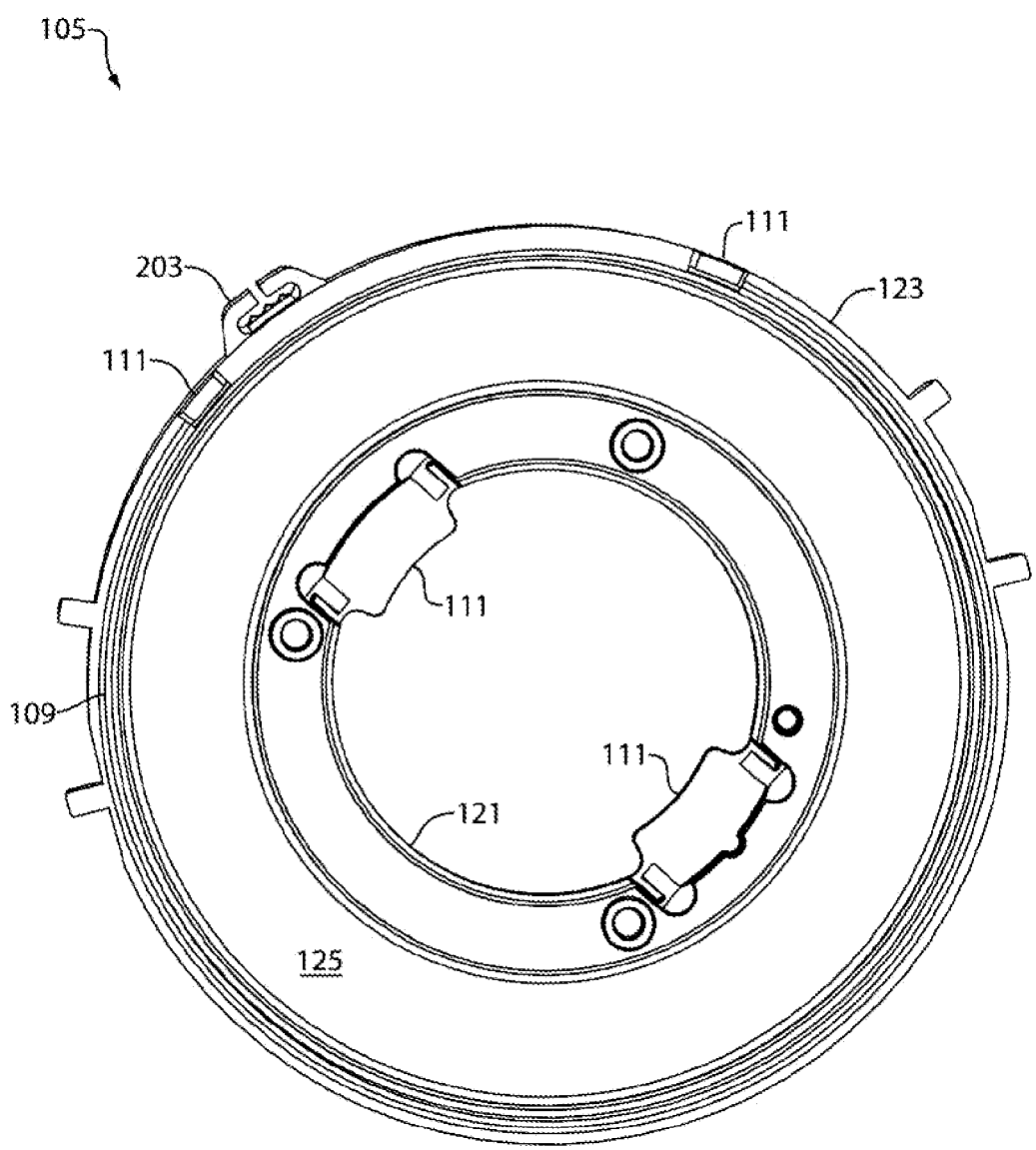
FIG. 49 is a perspective view of an auxiliary chassis component of the synthetic jet actuator of FIG. 1.
Figure 50:
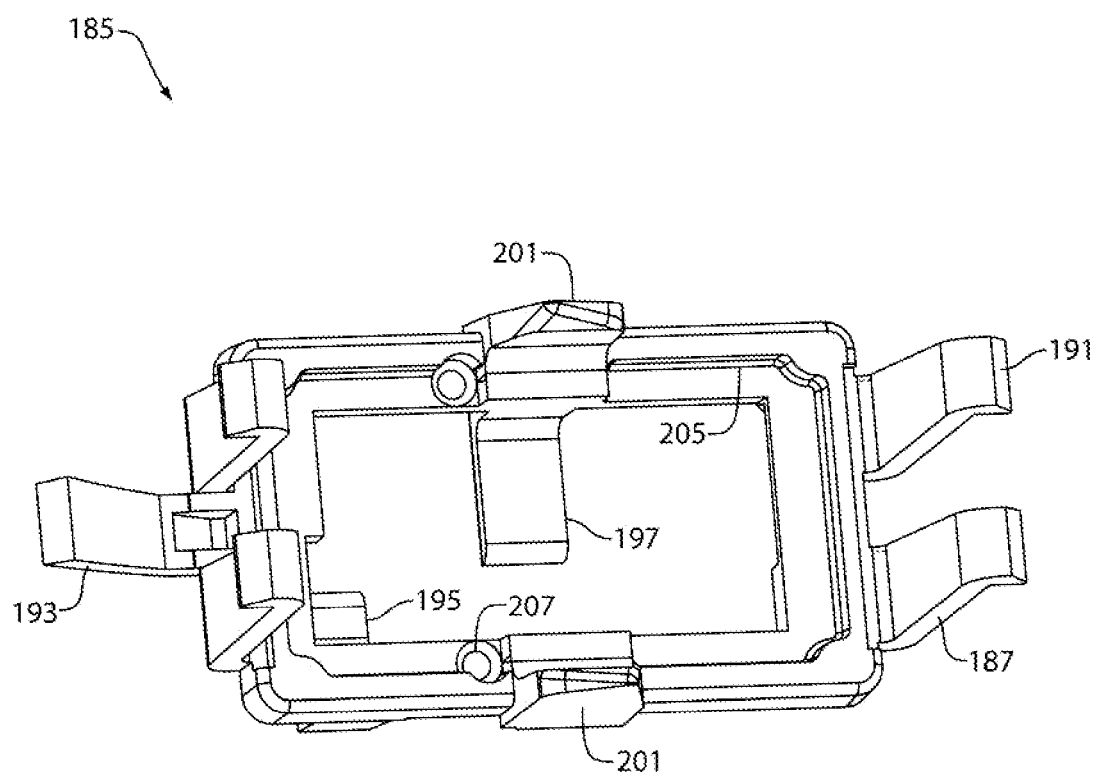
FIG. 50 is a perspective view of the clip of the synthetic jet actuator of FIG. 1.
Figure 51:
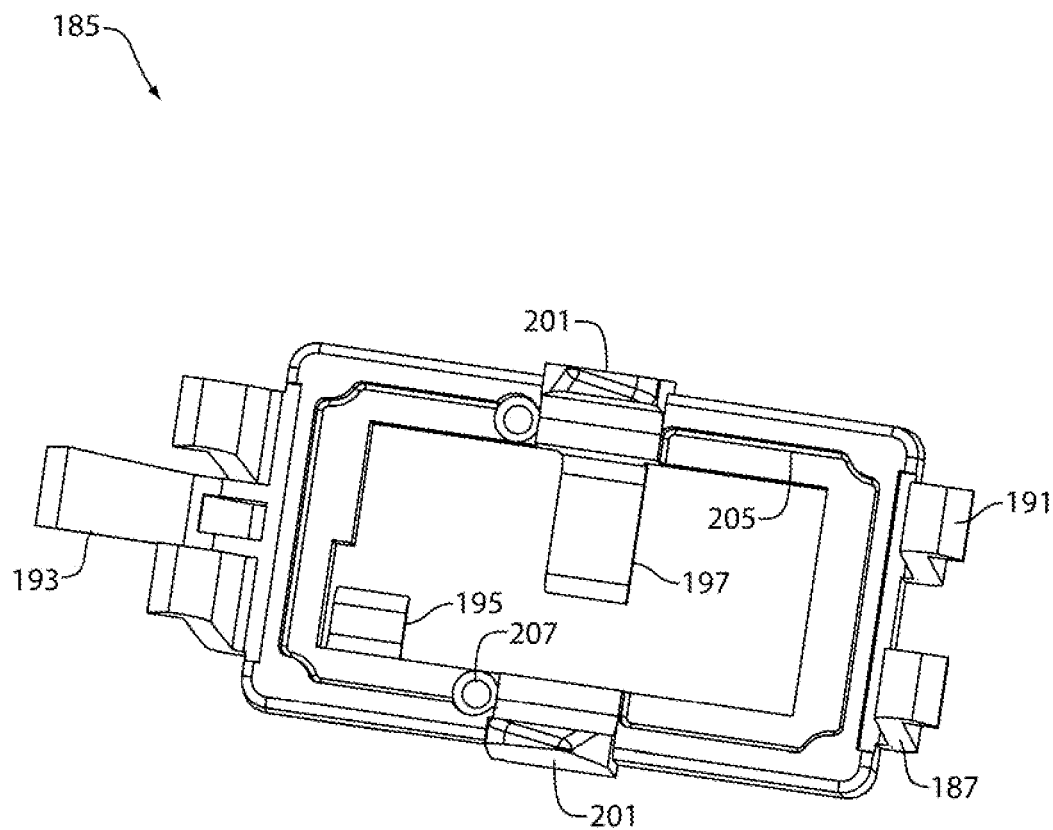
FIG. 51 is a perspective view of the clip of the synthetic jet actuator of FIG. 1.
Figure 52:
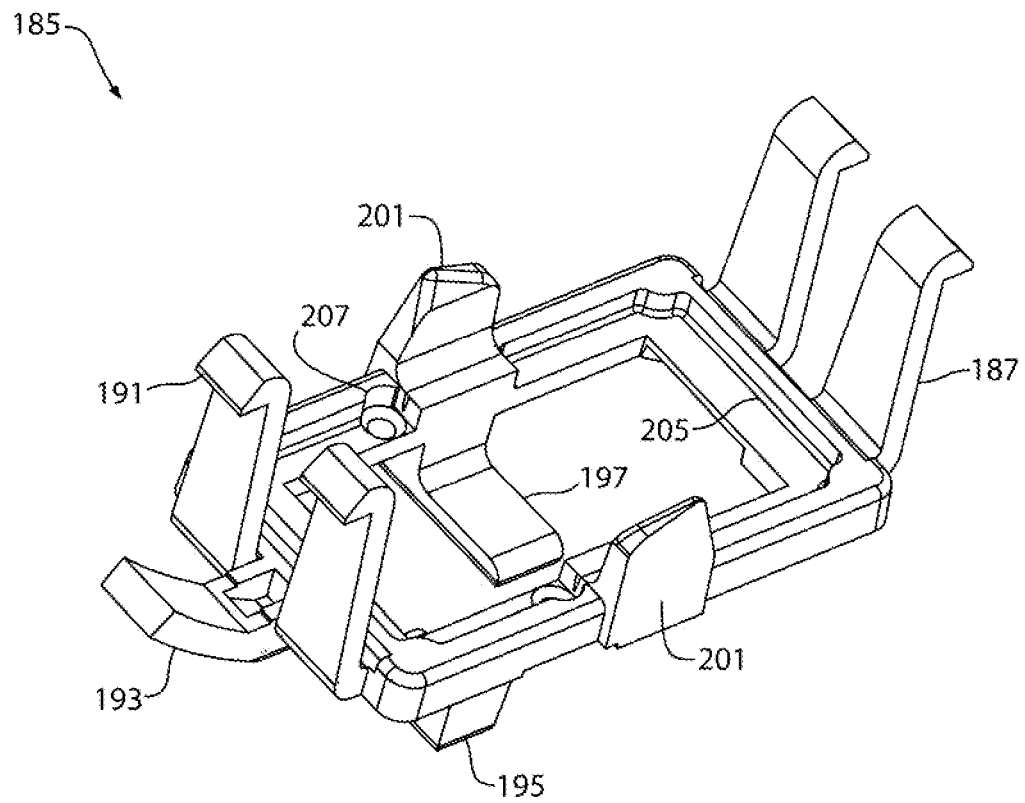
FIG. 52 is a perspective view of the clip of the synthetic jet actuator of FIG. 1.
Figure 53:
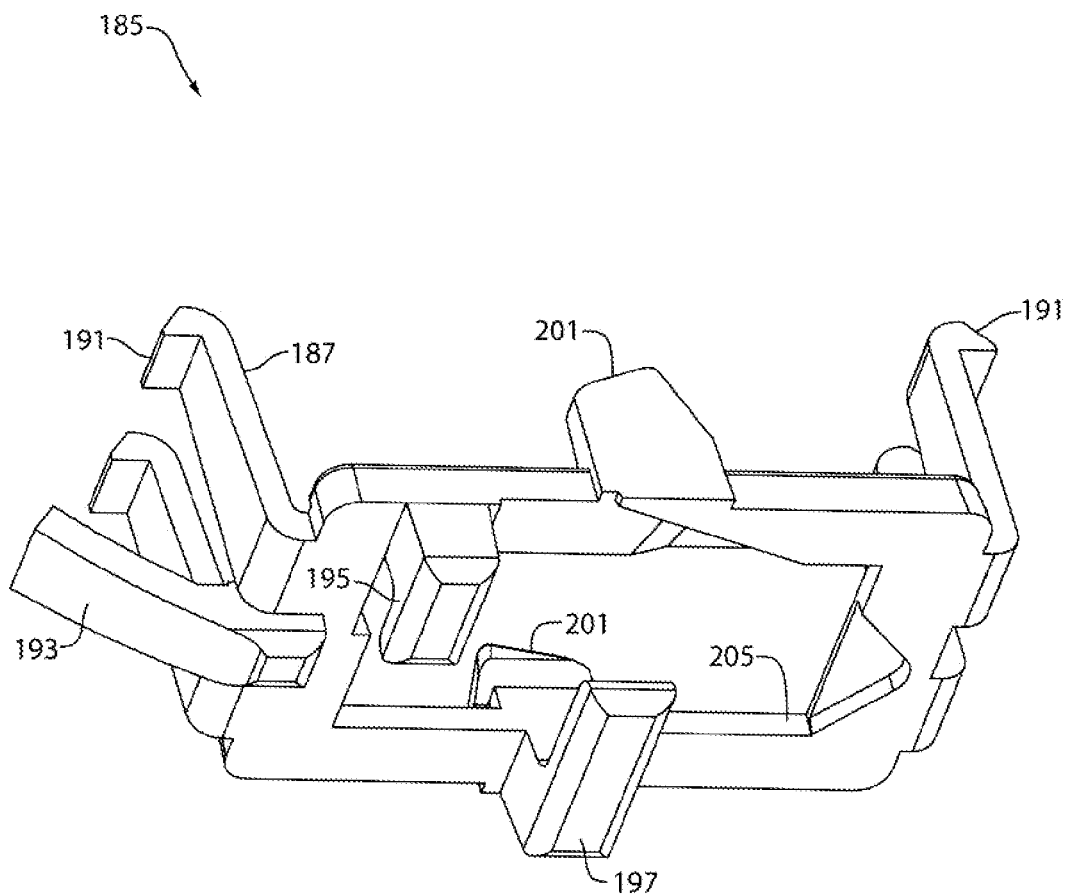
FIG. 53 is a perspective view of the clip of the synthetic jet actuator of FIG. 1.
Figure 54:
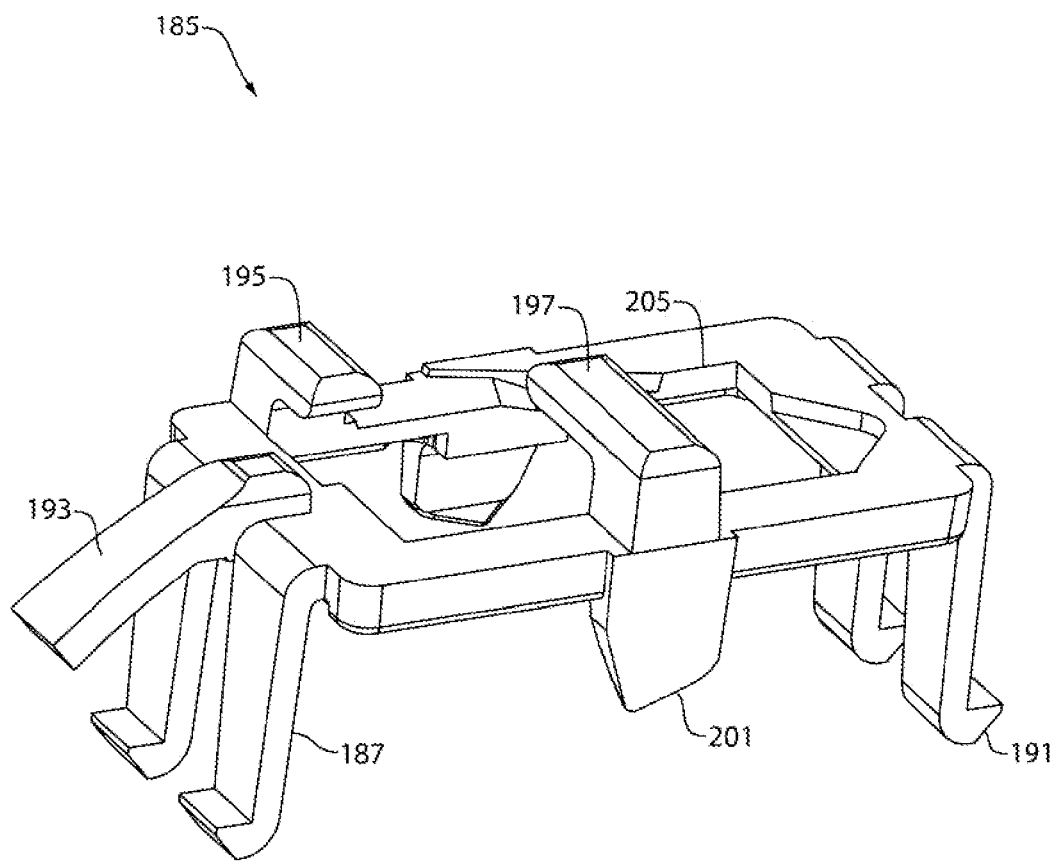
FIG. 54 is a perspective view of the clip of the synthetic jet actuator of FIG. 1.
Figure 55:
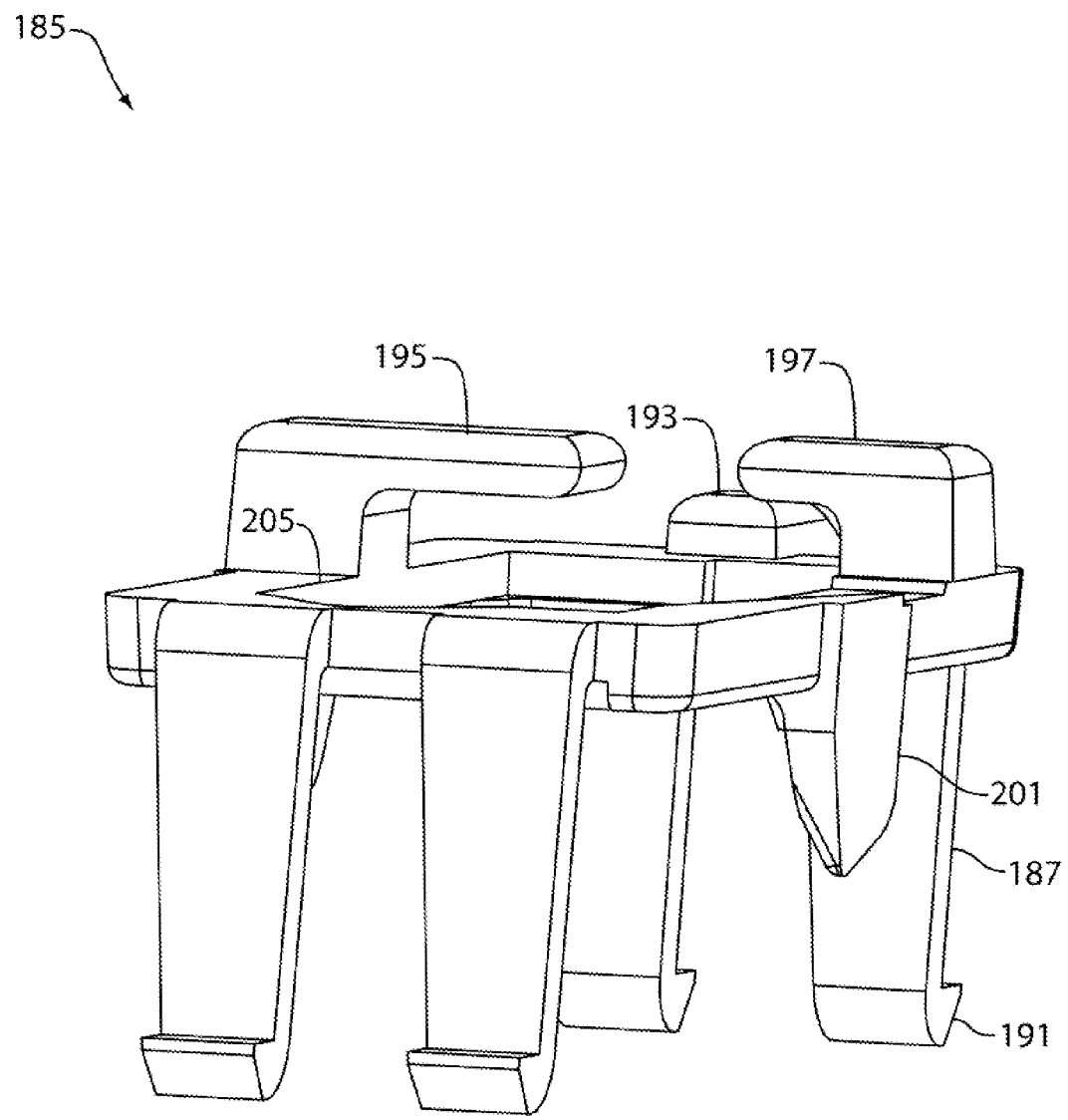
FIG. 55 is a perspective view of the clip of the synthetic jet actuator of FIG. 1.

Referring now to FIG. 49, auxiliary chassis components 105, 107 are equipped with a beveled lip 109 and a pair of tabs 111. The beveled lip 109 sits on a complimentary shaped lip 113 of the main chassis 103 (see, e.g., FIG. 12) and may be held in place, for example, through heat welding or the use of a suitable adhesive. The pair of tabs register with the faceted surfaces 115 and adjacent ledge 117 of the main chassis 103 adjacent to the wiring manifold 119 (see, e.g., FIG. 17, and explained in greater detail below), thus assuring proper alignment or registration of the auxiliary chassis components 105, 107 with the main chassis 103.

Referring to FIGS. 46-49, in the preferred embodiment depicted, auxiliary chassis components 105, 107 have a three component structure consisting of an inner ring 121, an outer ring 123 and a diaphragm 125 which extends between the inner ring 121 and the outer ring 123. In a preferred embodiment, the diaphragm 125 comprises a silicone polymer and is transfer molded in place, followed by annealing at 200° C. for 2-4 hours, to form the completed auxiliary chassis components 105, 107.

FIGS. 18-23 depict the voice coils 131 used in the synthetic jet ejector 101 depicted in FIGS. 1-7. The outer surface 133 of the voice coil 131 is equipped with a pair of opposing indentations or keys 135 which register with a complimentary-shaped set of tabs 111 (see, e.g., FIG. 46) in the auxiliary chassis components 105, 107 to lock the voice coil 131 in the proper orientation.

The voice coils 131 are further equipped with a set of electrically conductive pins 139 which are inserted through parallel channels provided in the body or voice coil body of the voice coils 131. The pins 139 are preferably rectangular in cross-section, and the channels preferably have a cross-sectional shape which is complimentary to the shape of the pins 139, thus minimizing the lateral and rotational movement of the pins 139 within the channels. The pins 139 are sized so that they extend slightly from each end of the channels. Of course, it will be appreciated that various other geometries or relative dimensions of the pins and other components may be utilized to similar effect. Thus, for example, the pins may have a variety of cross-sections at one or more points along their longitudinal axis, and these cross-sections may be polygons (including, but not limited to, triangles, squares, rectangles, parallelograms, pentagons and hexagons), circles, ellipses, or irregular shapes.

Figure 20:
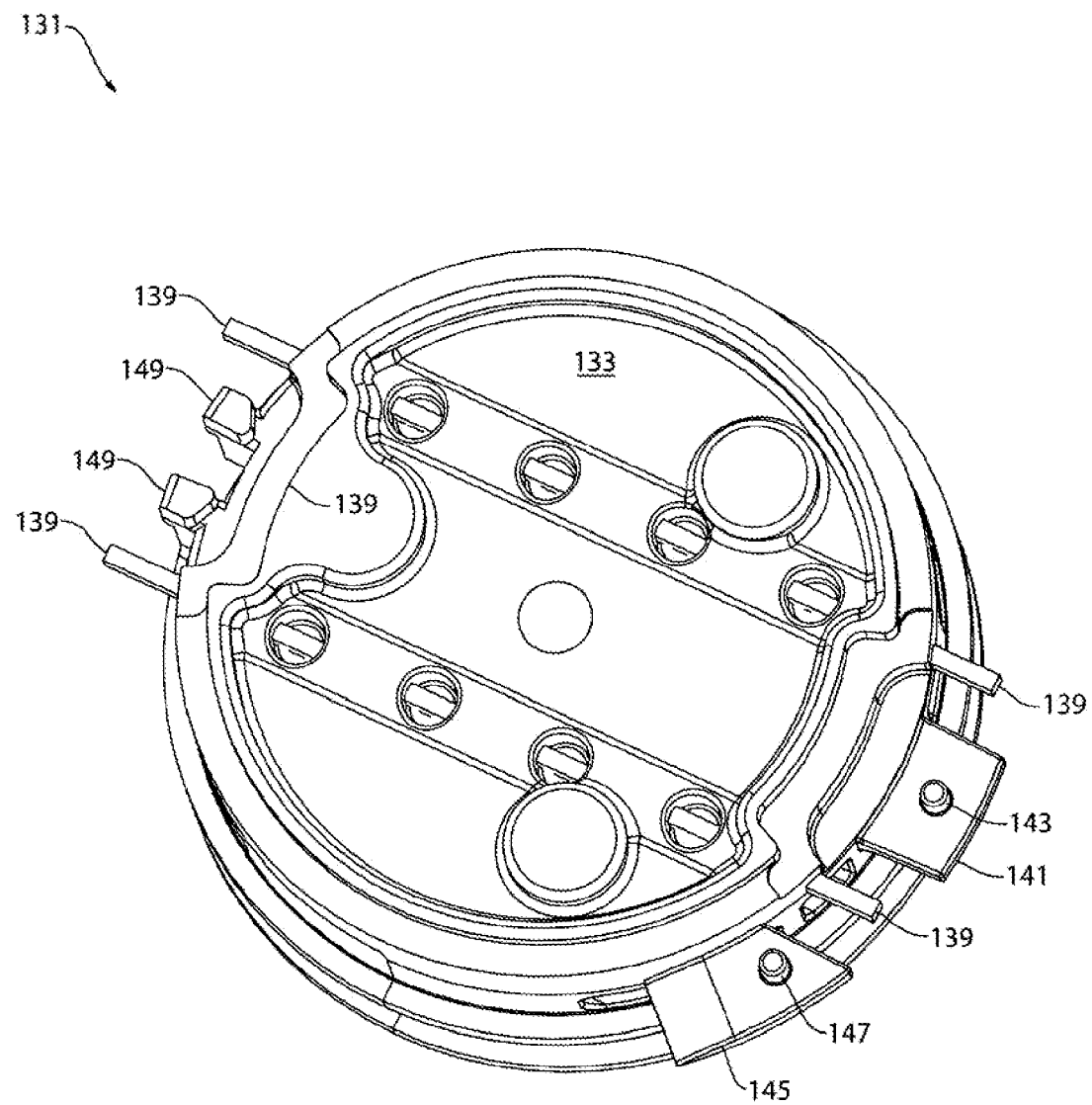
FIG. 20 is a perspective view of a voice coil made in accordance with the teachings herein, but without the wiring.
Figure 21:
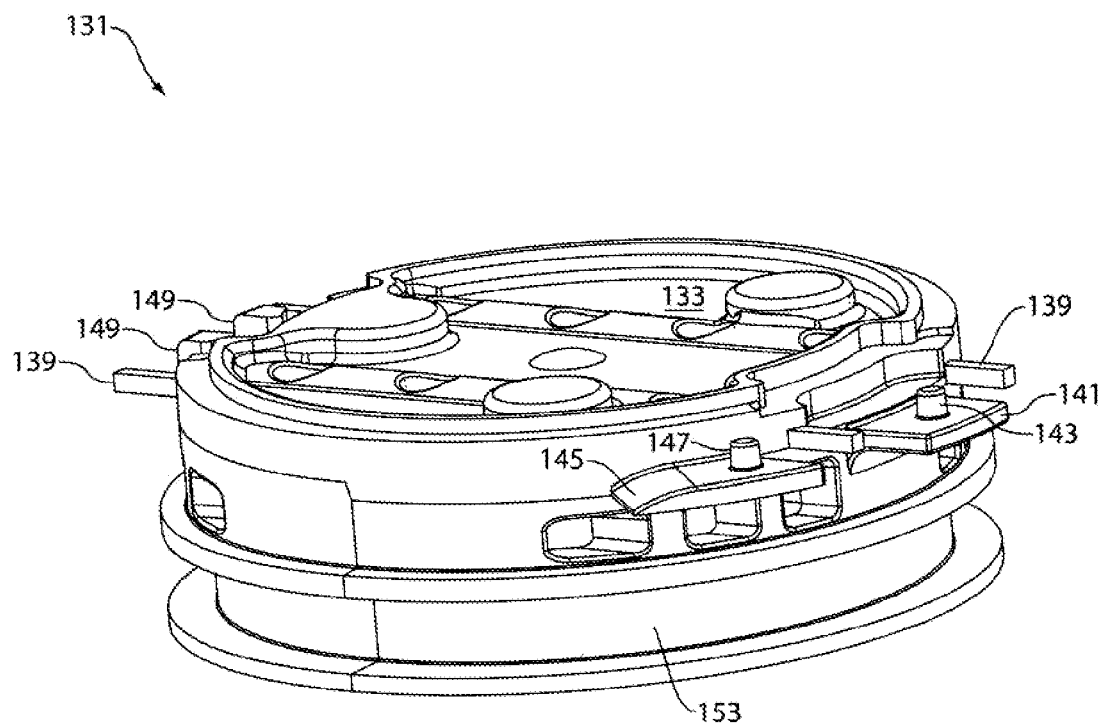
FIG. 21 is a perspective view of a voice coil made in accordance with the teachings herein, but without the wiring.
Figure 22:
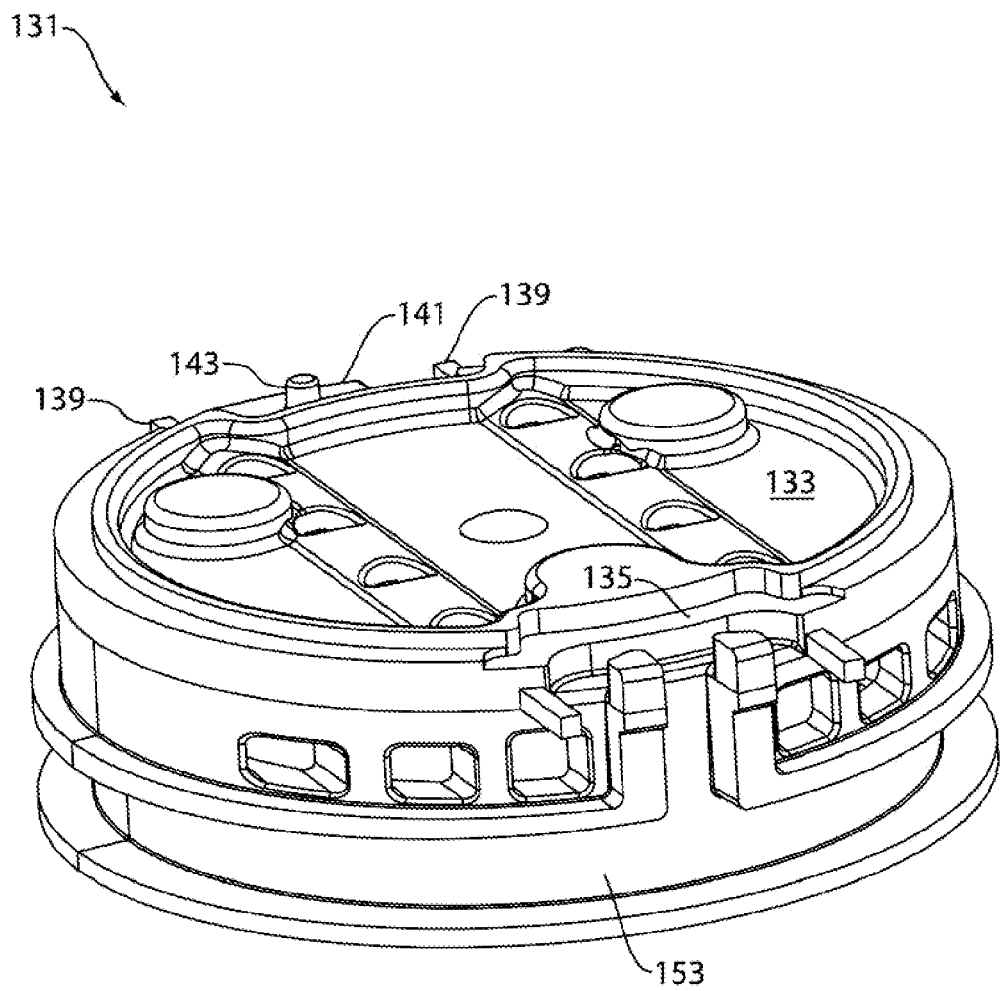
FIG. 22 is a perspective view of a voice coil made in accordance with the teachings herein, but without the wiring.
Figure 23:
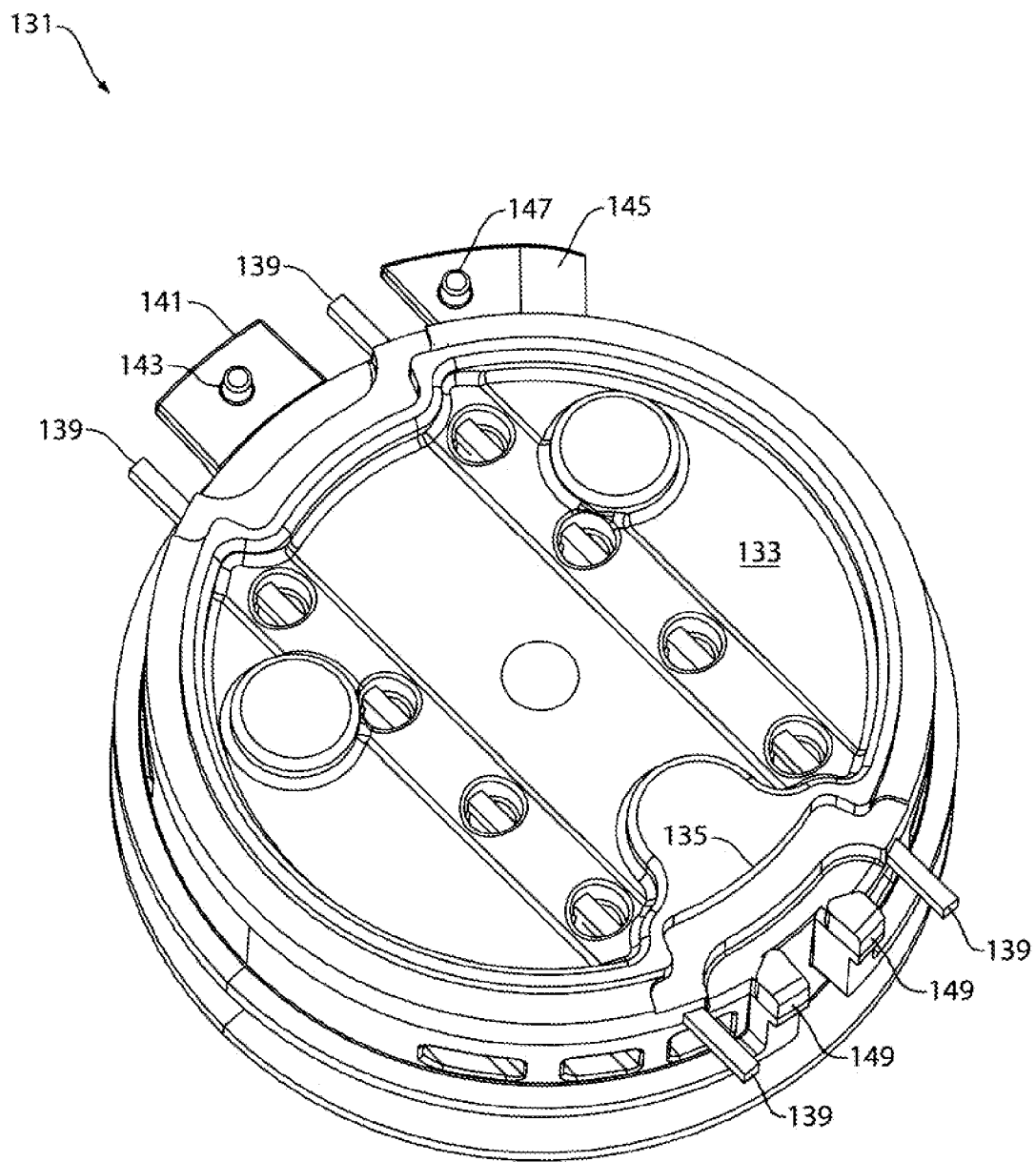
FIG. 23 is a perspective view of a voice coil made in accordance with the teachings herein, but without the wiring.
Figure 24:
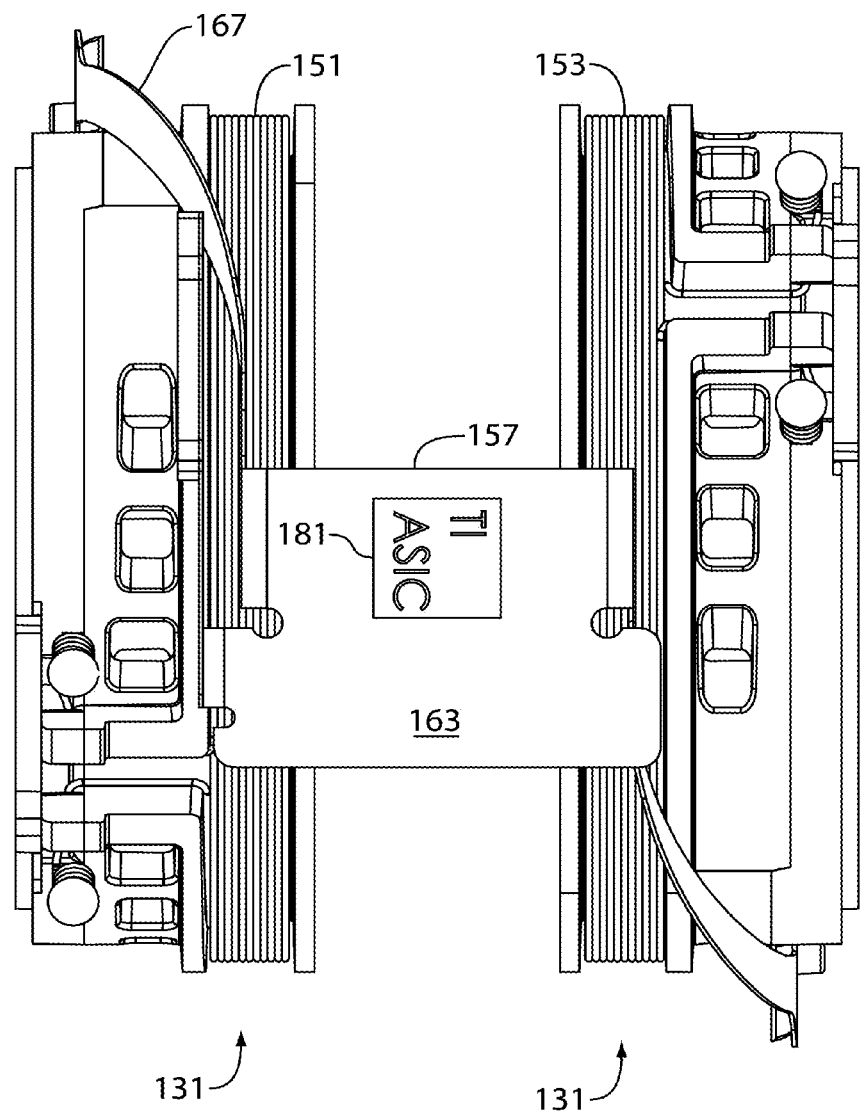
FIG. 24 is a side view of a voice coil assembly made in accordance with the teachings herein.
Figure 25:
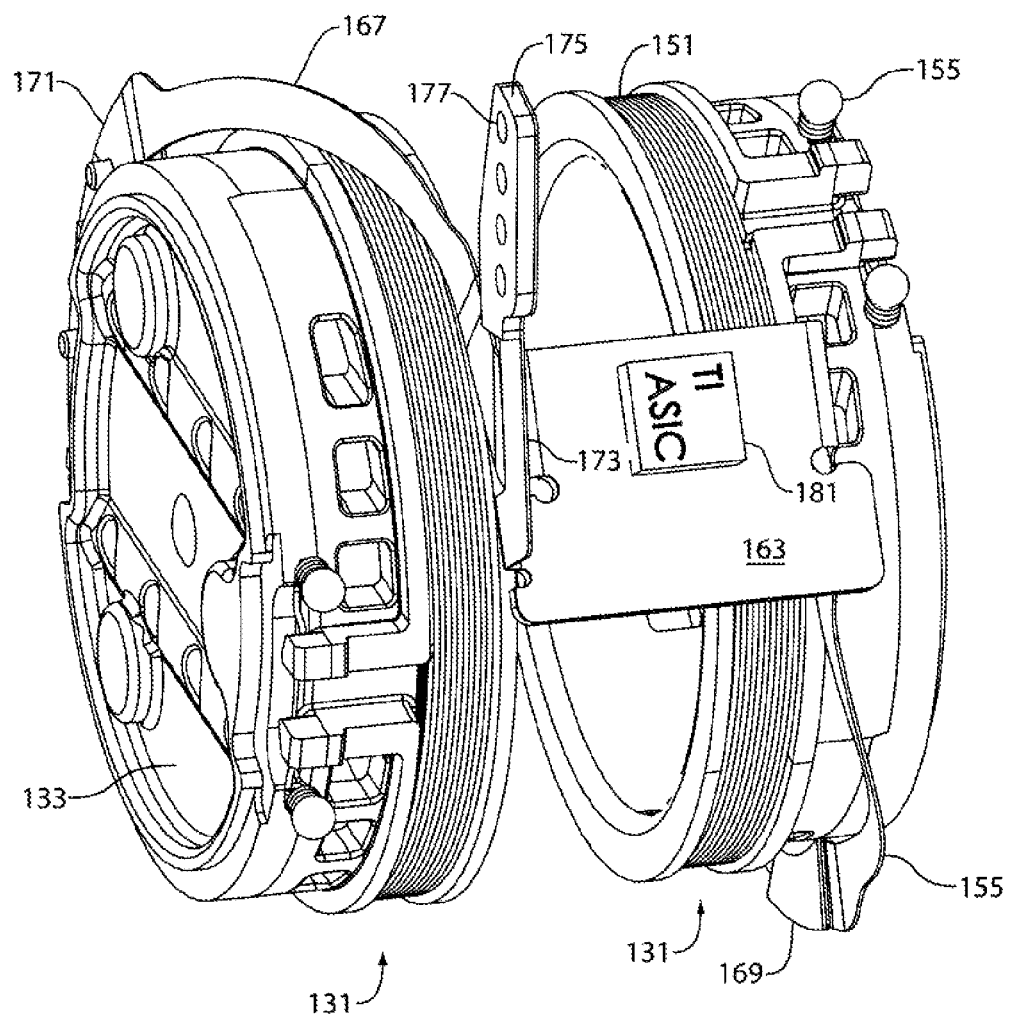
FIG. 25 is a perspective view of a voice coil assembly made in accordance with the teachings herein.

As best seen in FIG. 20, one side of the voice coil 131 is equipped with a first platform 141 which is equipped with a first protrusion 143, and a second platform 145 which is equipped with a second protrusion 147. The opposing side of each of the voice coils 131 is equipped with a pair of opposing tabs 149. The purpose of these features may be appreciated with respect to FIGS. 31-36, which depict the voice coils 131 with the electrically conductive wiring 151 of the voice coil wrapped around the spool portion 153 thereof, and FIGS. 25-30, which depict a pair of opposing voice coils 131.

As seen in FIGS. 32-35, a bulbous cap 155 is attached to the portion of the pins 139 extending adjacent to the pair of opposing tabs 149. A first end of the wiring 151 is directed through the narrow space between one of the opposing tabs 149 and the body of the voice coil 131, and is wrapped around the protruding portion of the pin 139 adjacent to the bulbous cap 155. The second end of the wiring 151 is wrapped around the second pin 139 in a similar manner. This configuration ensures that the wiring 151 is maintained in a proper state of tension at all times and is in electrical communication with the pins 139.

Figure 9:
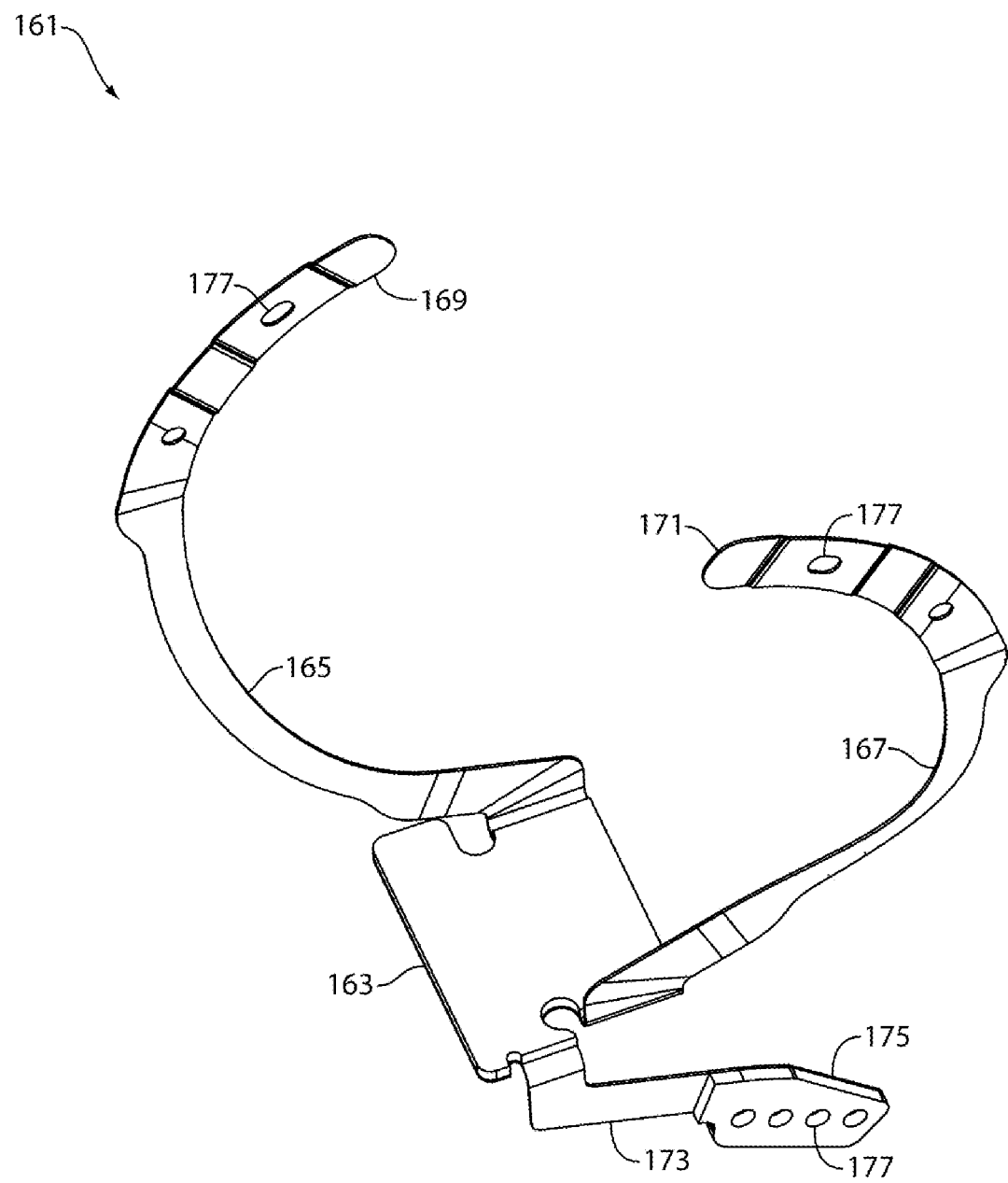
FIG. 9 is a perspective view of a flexible, electrically conductive connector made in accordance with the teachings herein.
Figure 10:
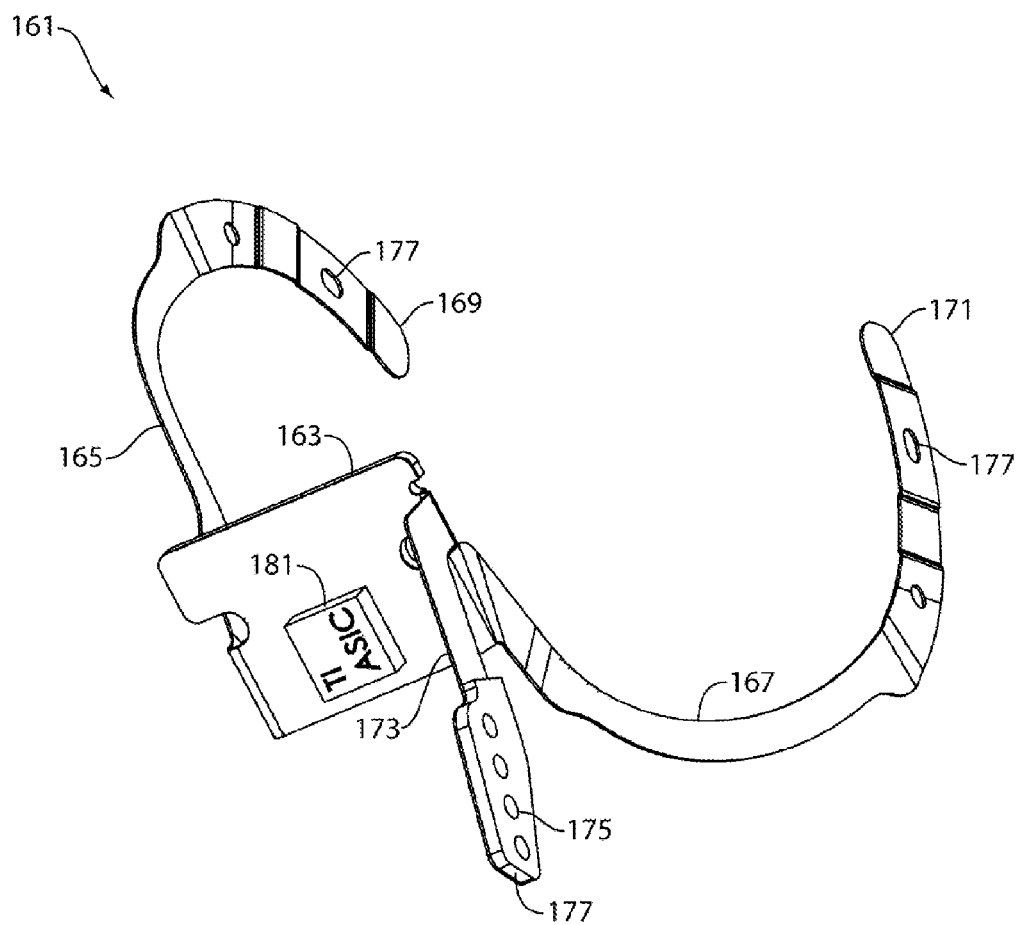
FIG. 10 is a perspective view of a flexible, electrically conductive connector made in accordance with the teachings herein.
Figure 11:
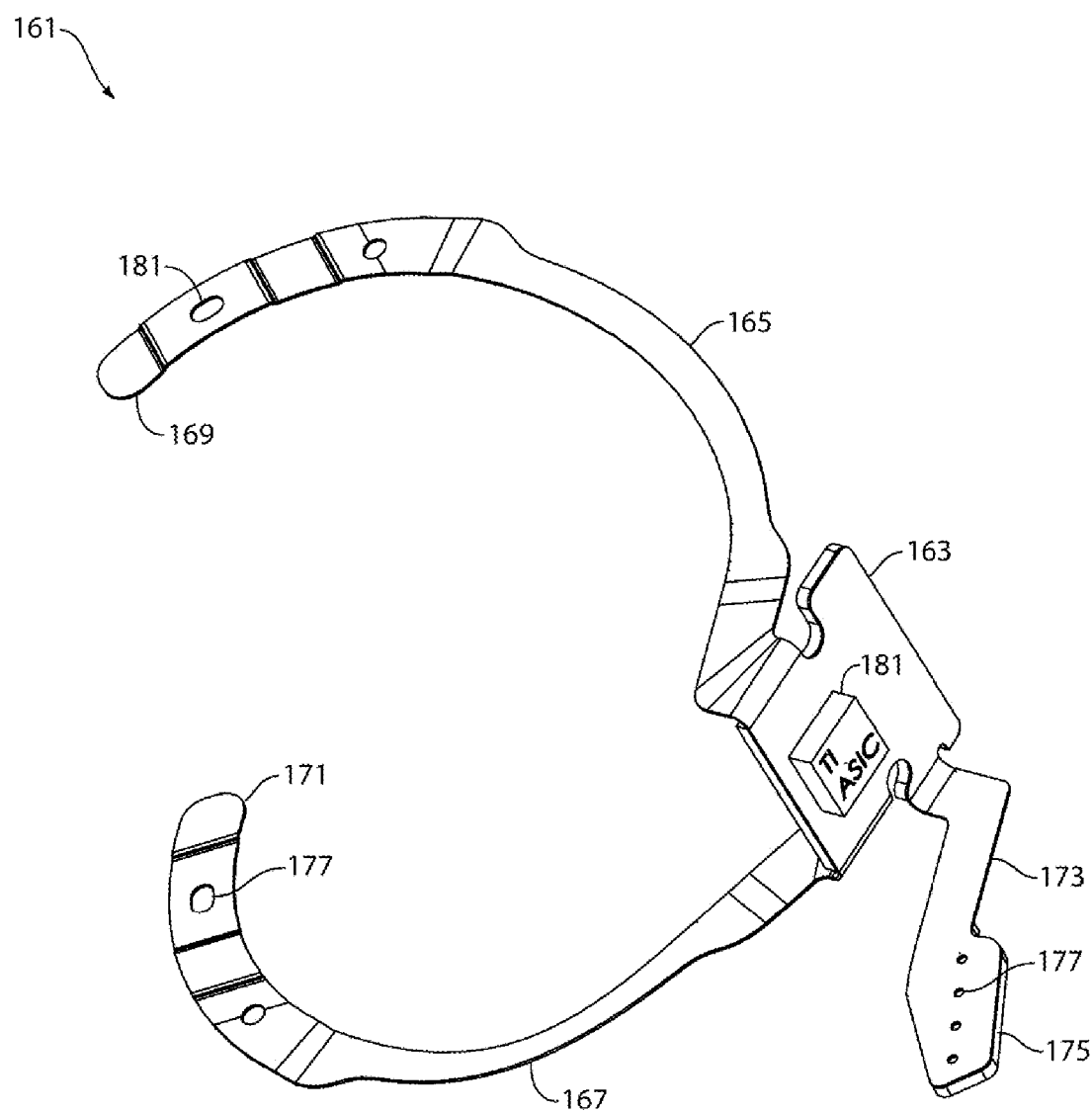
FIG. 11 is a perspective view of a flexible, electrically conductive connector made in accordance with the teachings herein.
Figure 12:
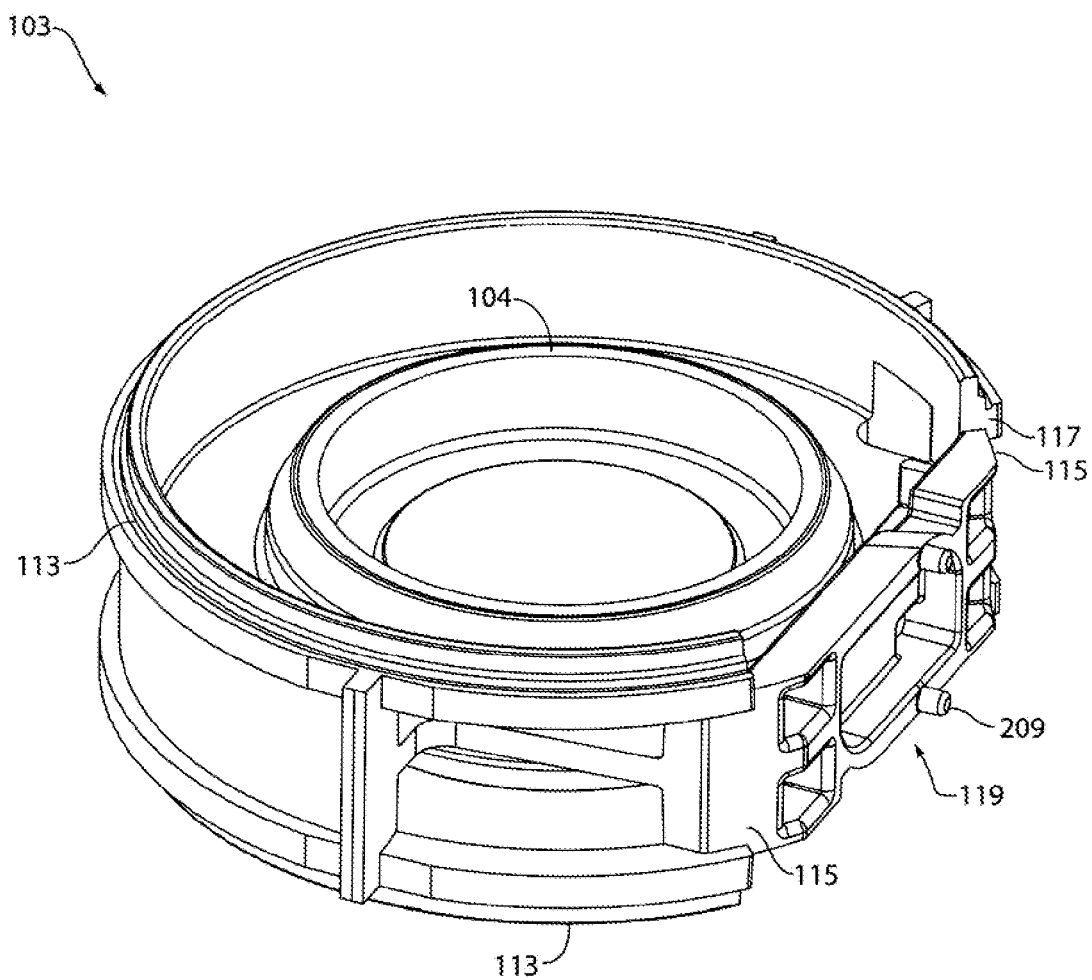
FIG. 12 is a perspective view of the main chassis of a synthetic jet actuator made in accordance with the teachings herein.

Referring now to FIGS. 9-11, a flexible, electrically conductive connector 161 is provided which provides electrical connectivity between an external source of power (not shown) and the internal circuitry of the synthetic jet actuator 101. The placement of the connector 161 is depicted in FIGS. 24-29.

As seen in FIGS. 9-11, the connector 161 comprises a central portion 163 having first 165 and second 167 arms extending therefrom which terminate in first 169 and second 171 terminal portions, respectively, and a third arm 173 which terminates in a third terminal portion 175. The first 169 and second 171 terminal portions are essentially mirror images of each other and are provided with a series of apertures 177 therein. The third terminal portion 175 is also provided with a series of apertures 177. As best seen in FIGS. 10-11, the central portion 163 is equipped with a semiconductor chip 181 or other control device which controls the operation of the synthetic jet actuator 101.

The connector 161 is preferably cut or stamped from a single piece of a flexible, conductive material, and is even more preferably made using flexible electronics technology (also known as flex circuitry). Thus, for example, the connector 161 may be constructed by forming suitable circuitry for the connector 161 on a flexible plastic substrate such as a film of polyimide or PEEK (polyether ether ketone), or by screen printing the circuitry using a suitable metal (such as silver) on a polyester substrate. The central portion 163 and the third terminal portion 175 preferably have an additional layer of plastic or some other suitably rigid material laminated or adhered to them to increase the rigidity of these components.

Figure 26:
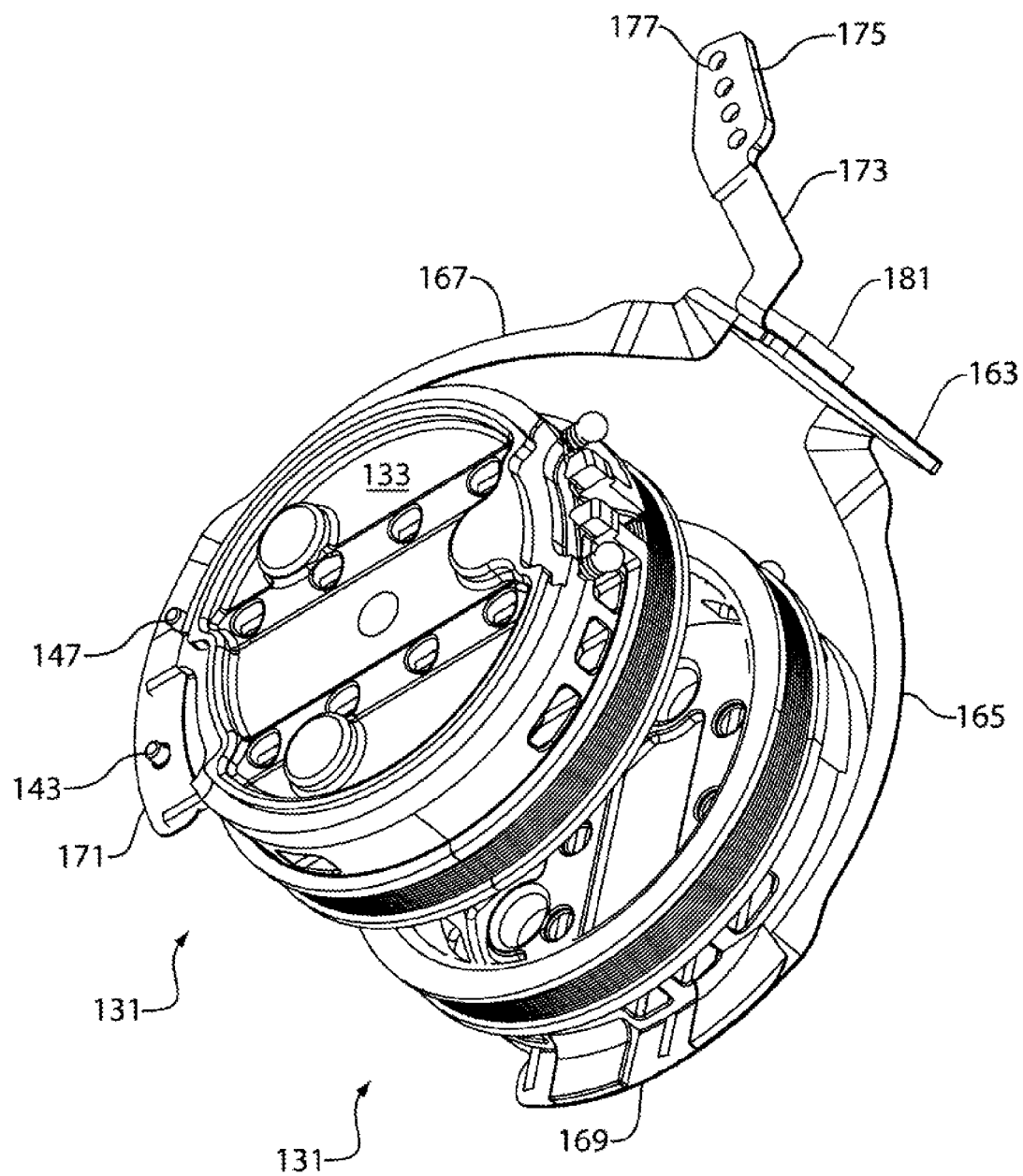
FIG. 26 is a perspective view of a voice coil assembly made in accordance with the teachings herein.
Figure 27:
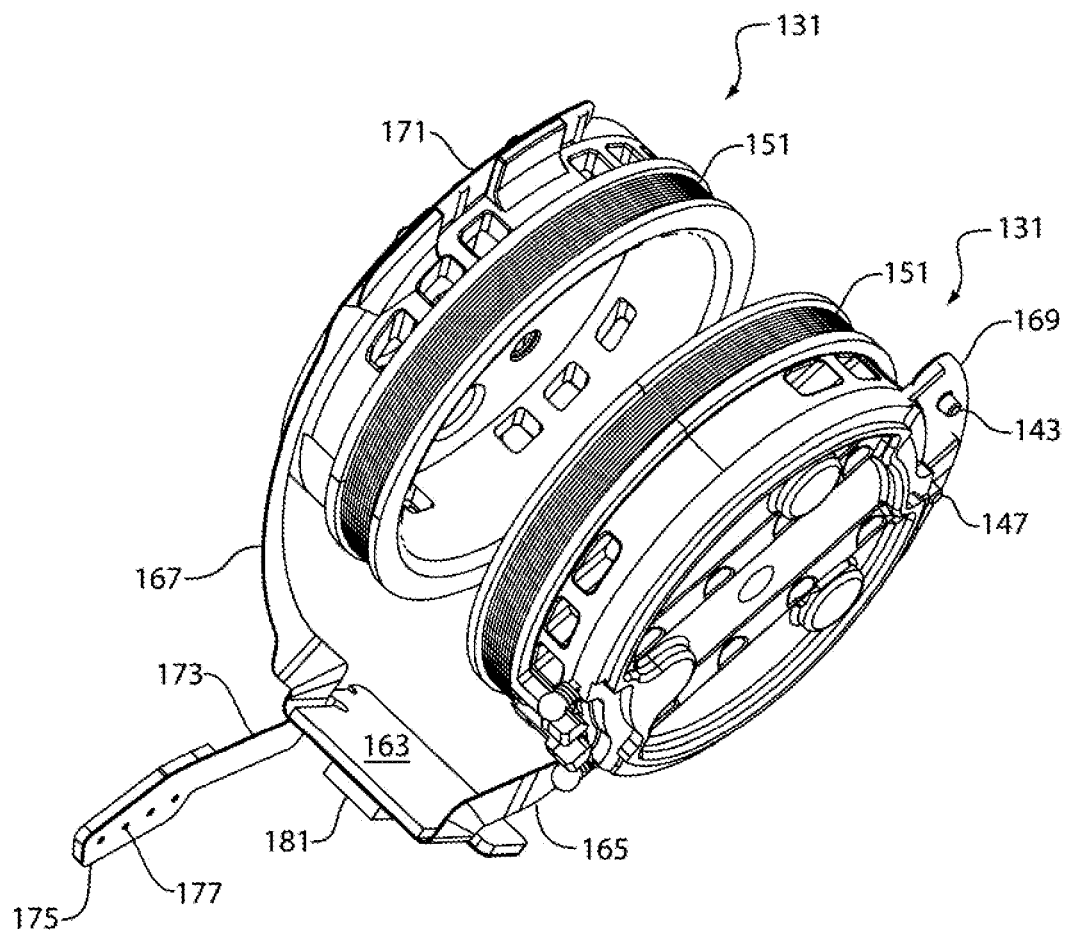
FIG. 27 is a perspective view of a voice coil assembly made in accordance with the teachings herein.
Figure 28:
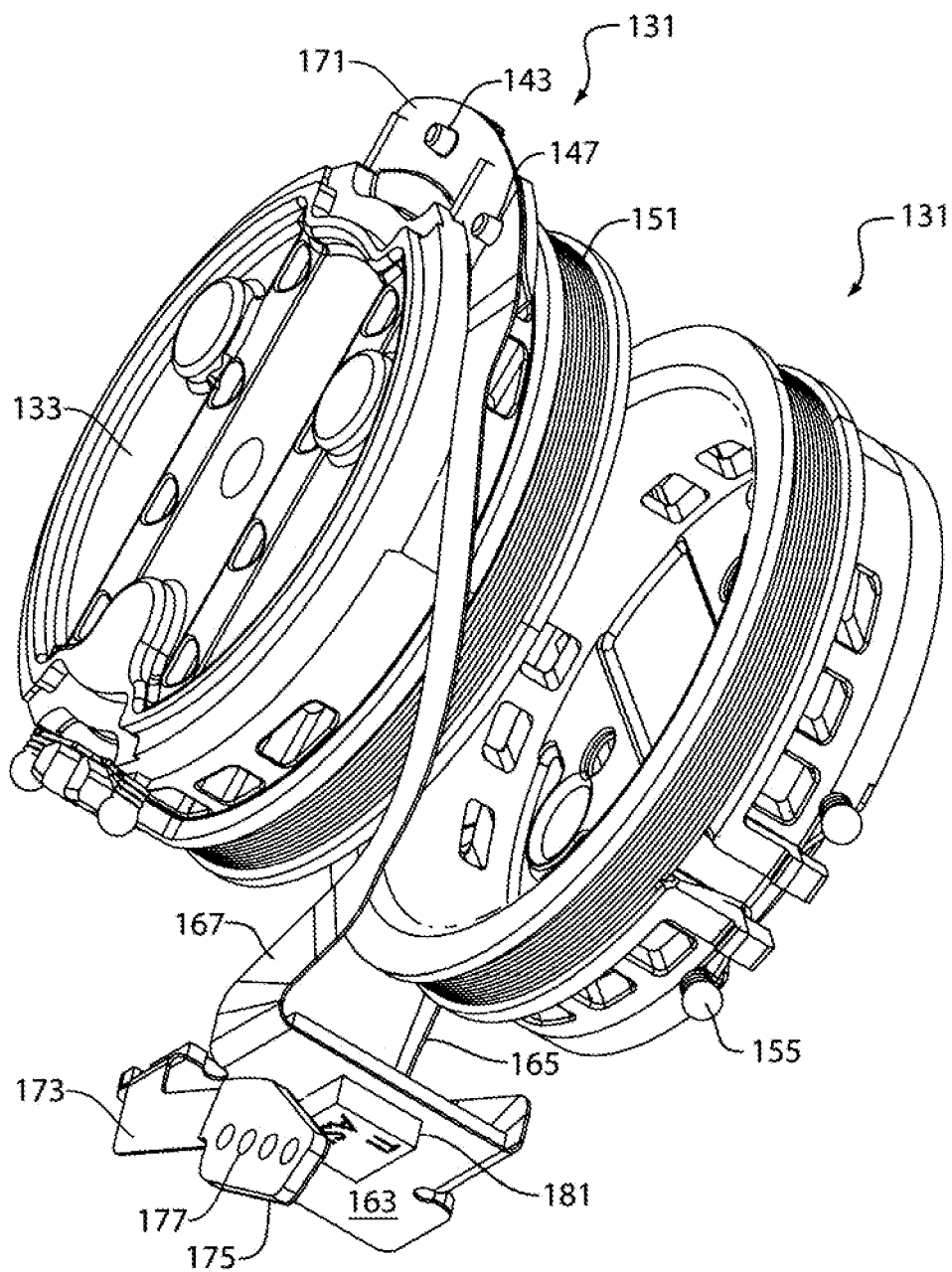
FIG. 28 is a perspective view of a voice coil assembly made in accordance with the teachings herein.
Figure 29:
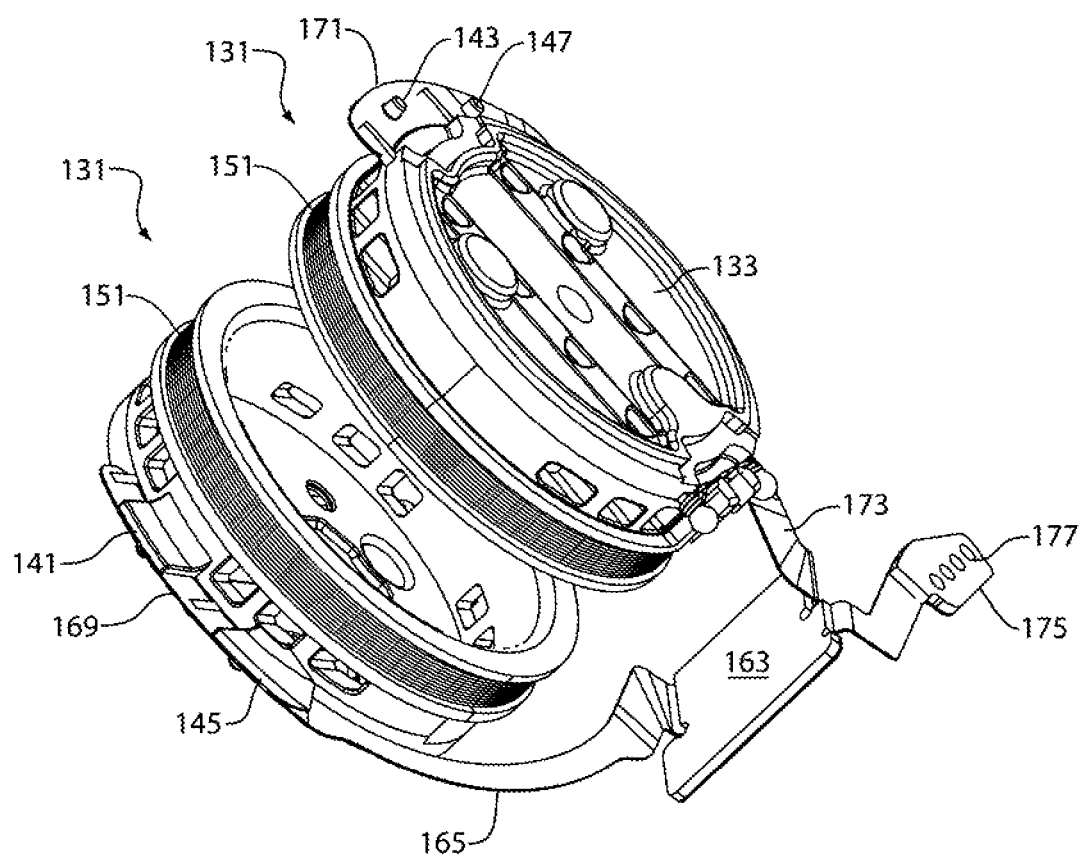
FIG. 29 is a perspective view of a voice coil assembly made in accordance with the teachings herein.
Figure 30:
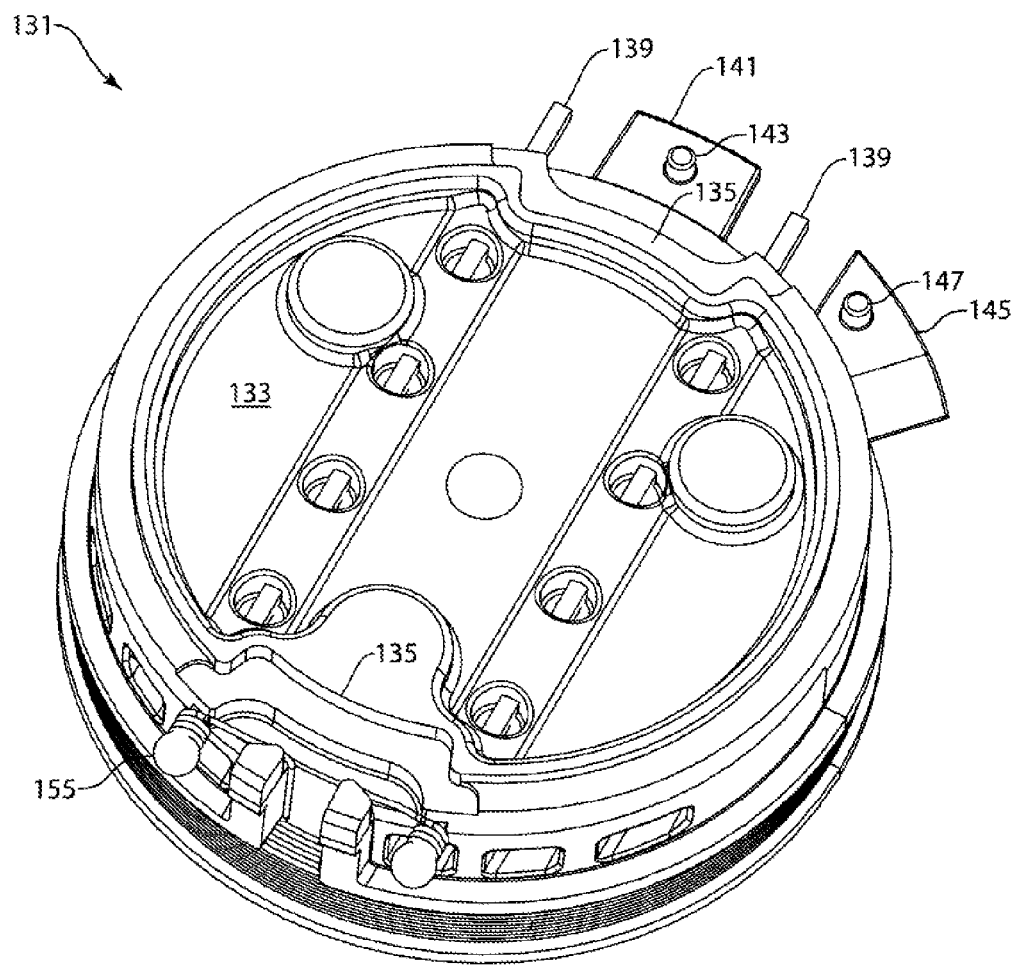
FIG. 30 is a perspective view of a voice coil made in accordance with the teachings herein.
Figure 31:
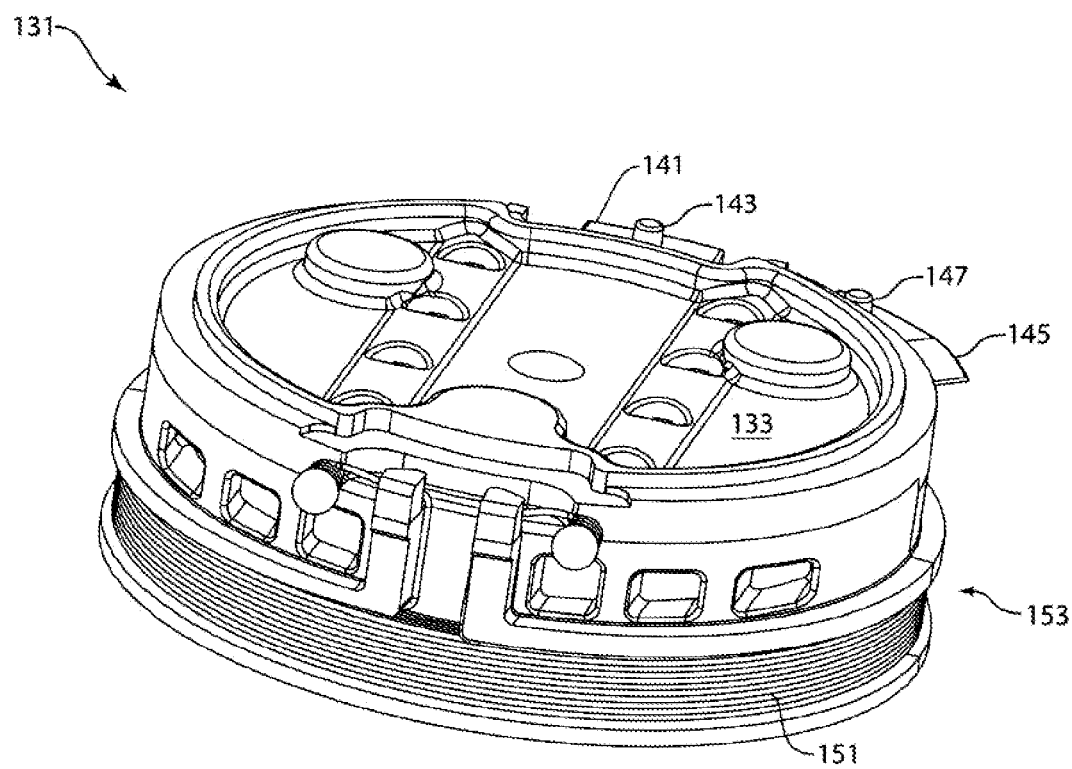
FIG. 31 is a perspective view of a voice coil made in accordance with the teachings herein.
Figure 32:
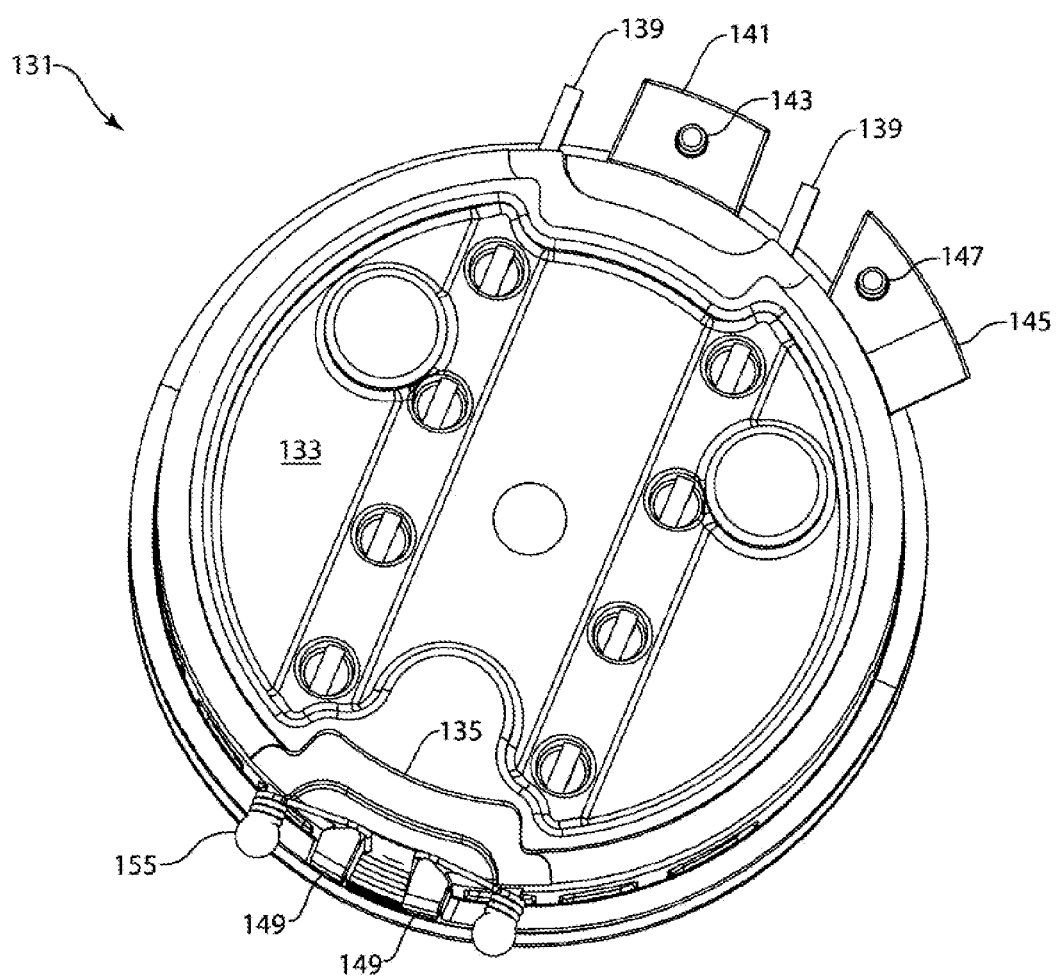
FIG. 32 is a perspective view of a voice coil made in accordance with the teachings herein.
Figure 33:
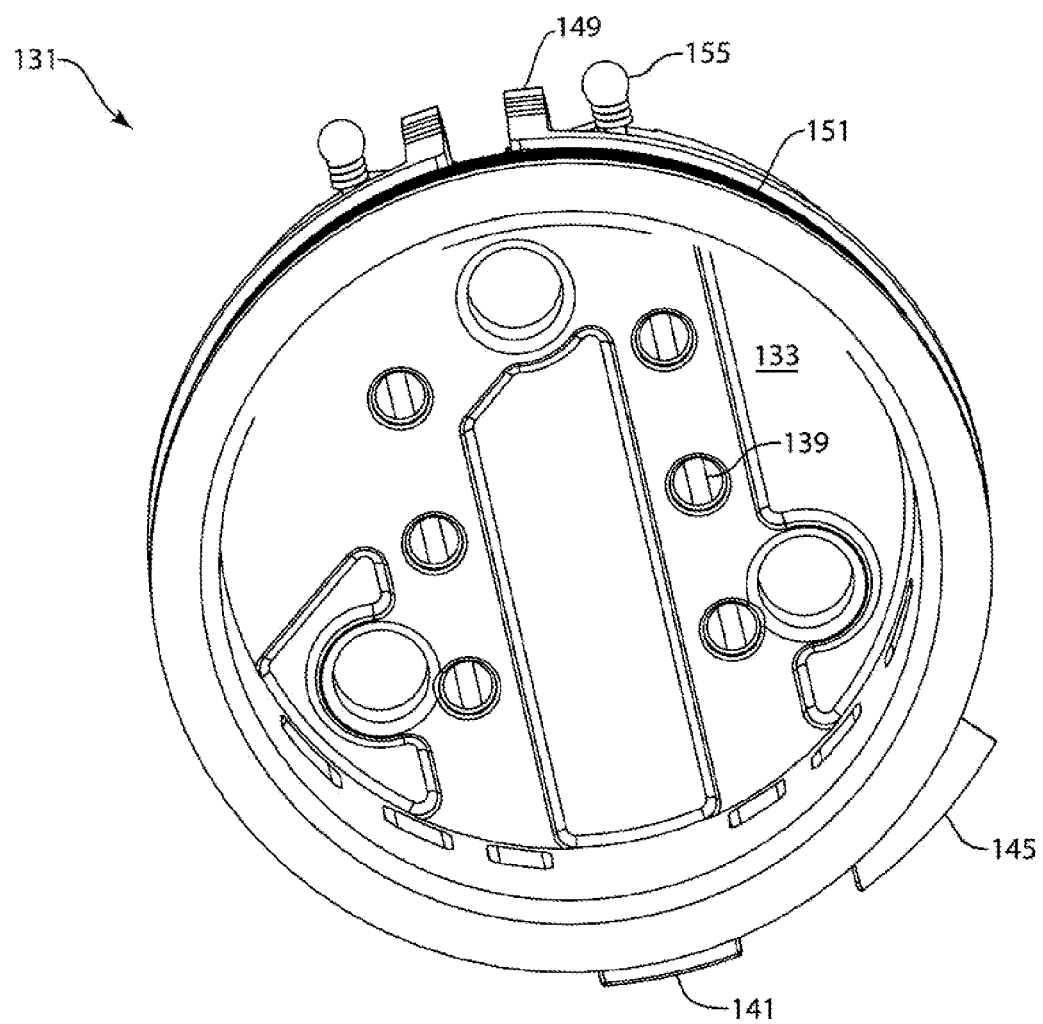
FIG. 33 is a perspective view of a voice coil made in accordance with the teachings herein.
Figure 34:
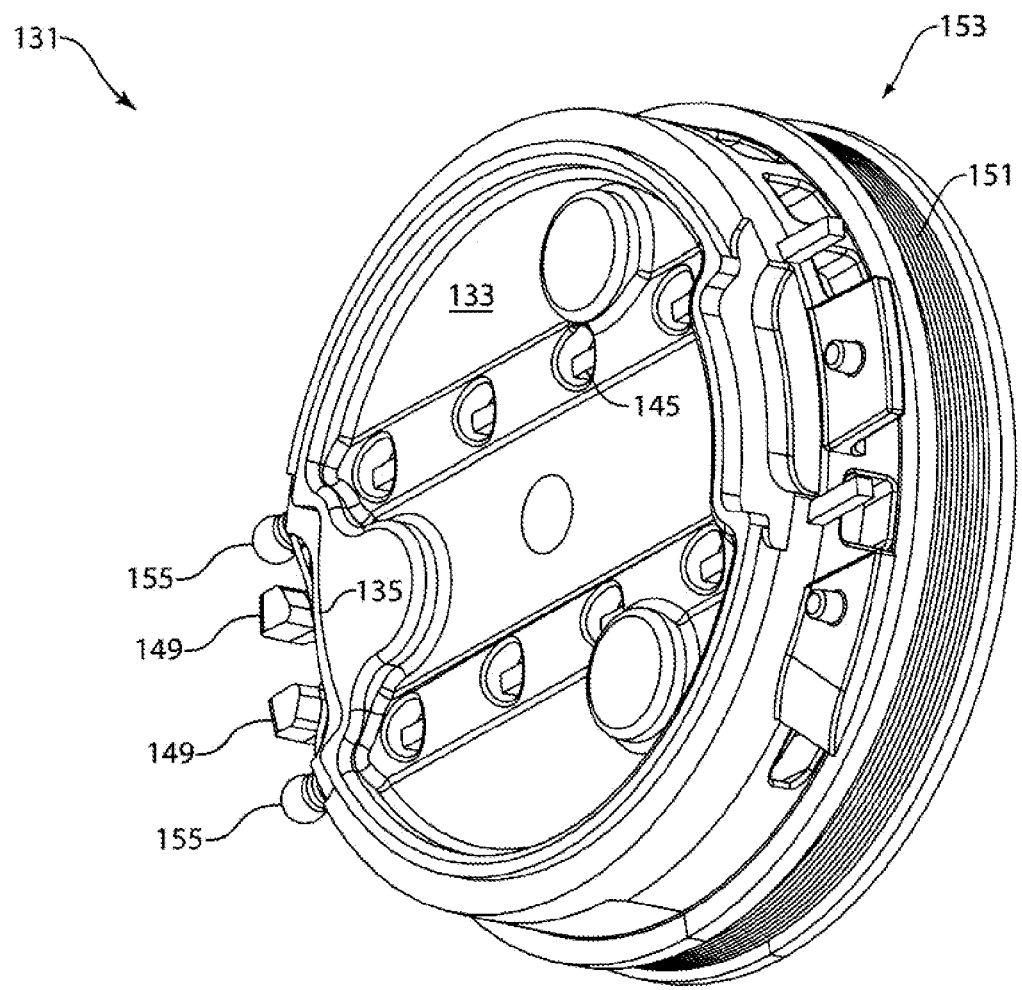
FIG. 34 is a perspective view of a voice coil made in accordance with the teachings herein.
Figure 35:
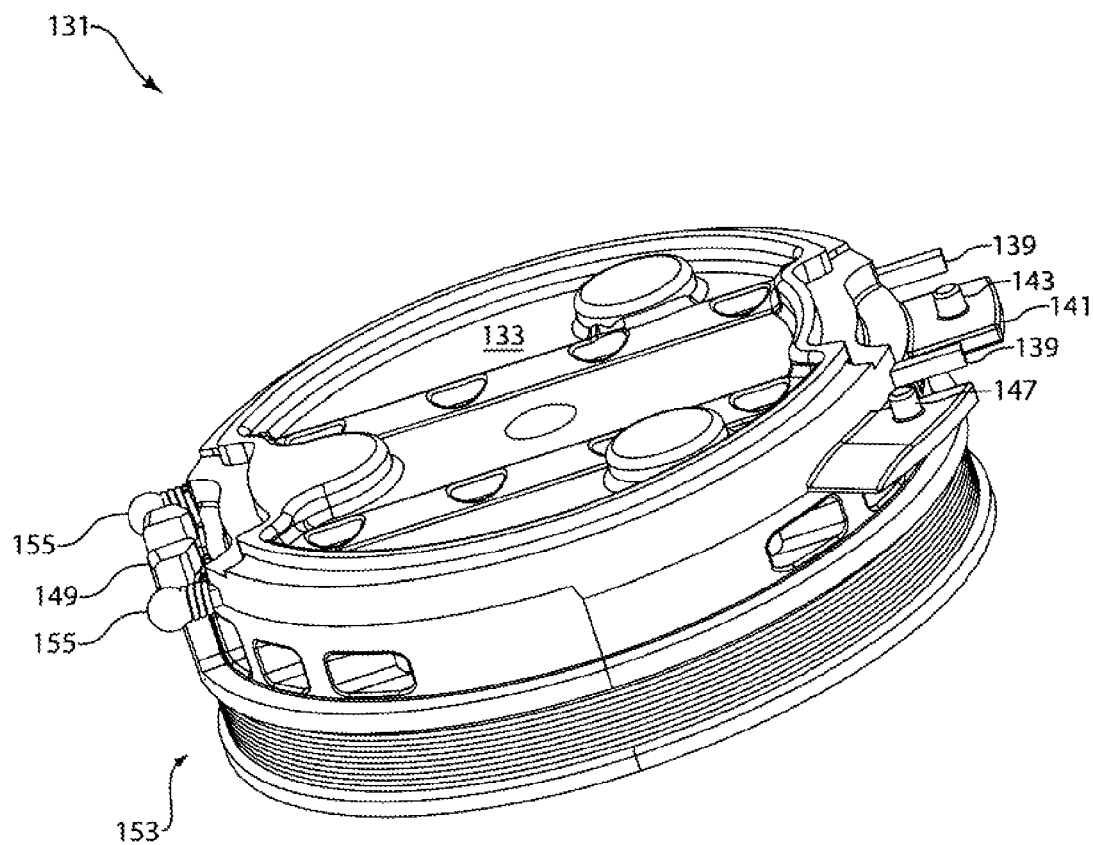
FIG. 35 is a perspective view of a voice coil made in accordance with the teachings herein.
Figure 36:
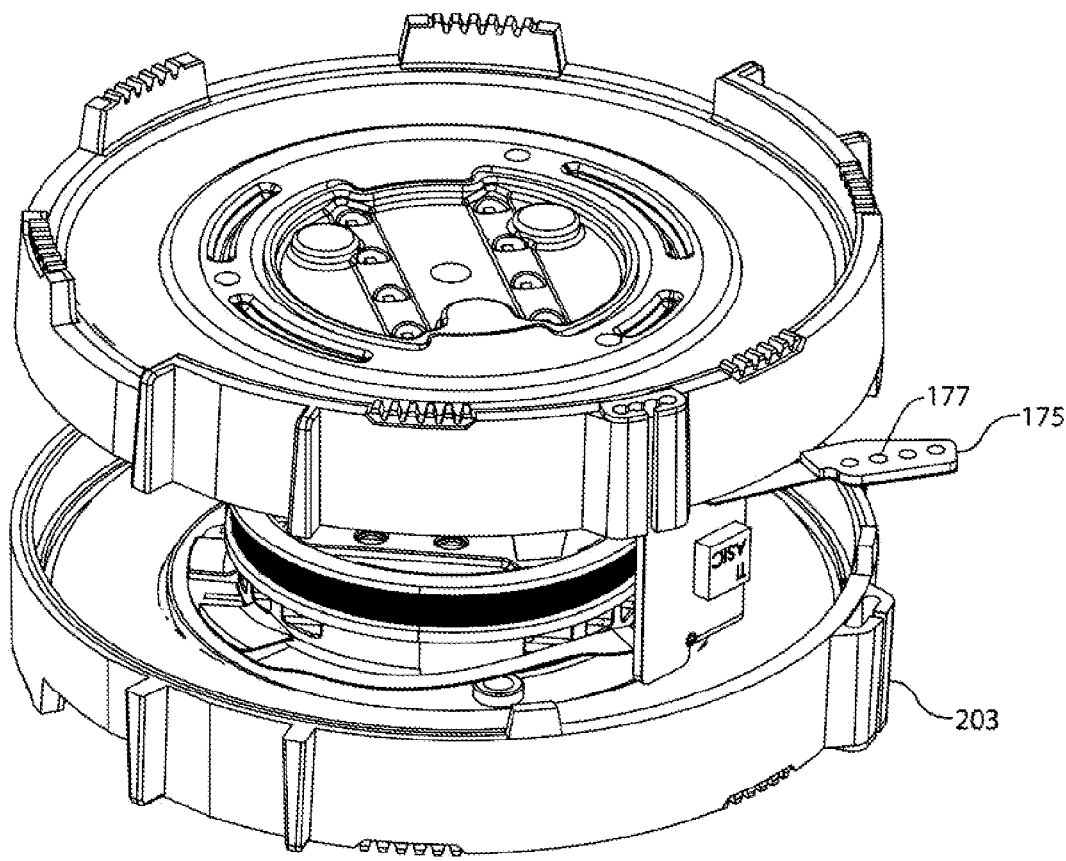
FIG. 36 is a perspective view of the synthetic jet actuator of FIG. 1 with the main chassis removed to show the details of the interior of the device.
Figure 37:
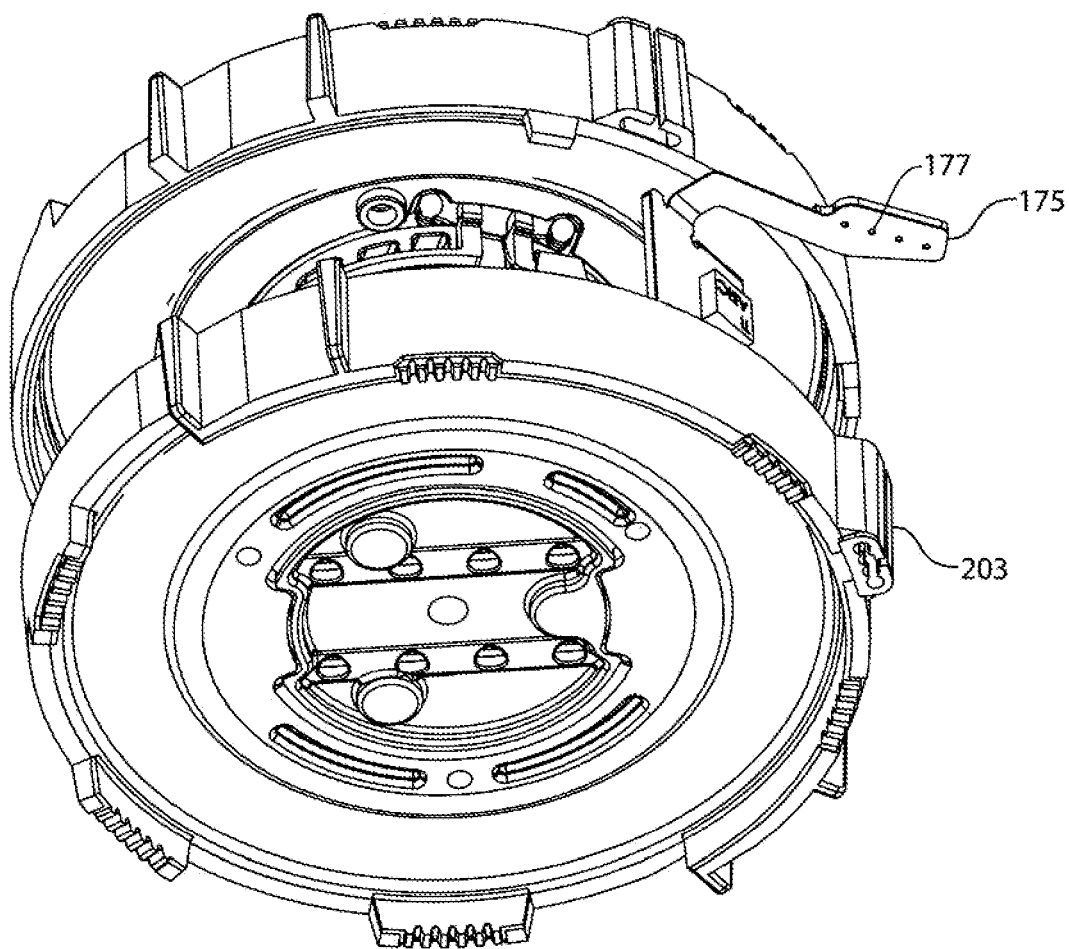
FIG. 37 is a perspective view of the synthetic jet actuator of FIG. 1 with the main chassis removed to show the details of the interior of the device.
Figure 38:
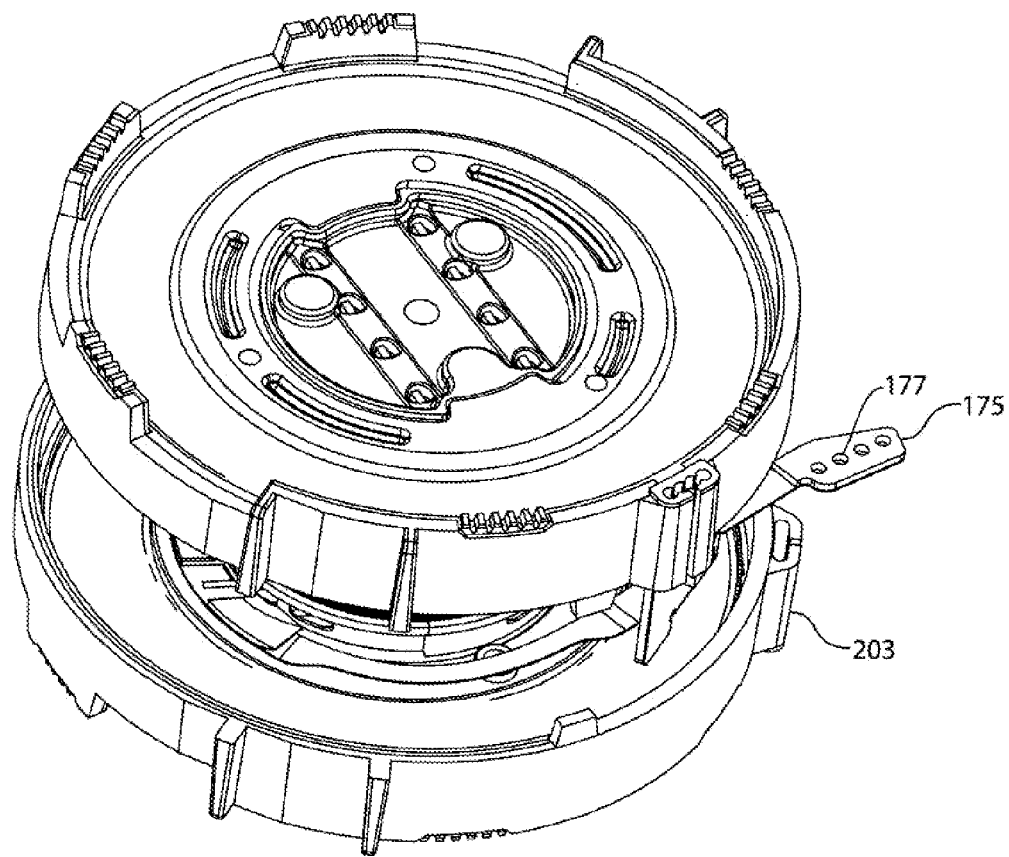
FIG. 38 is a perspective view of the synthetic jet actuator of FIG. 1 with the main chassis removed to show the details of the interior of the device.
Figure 39:
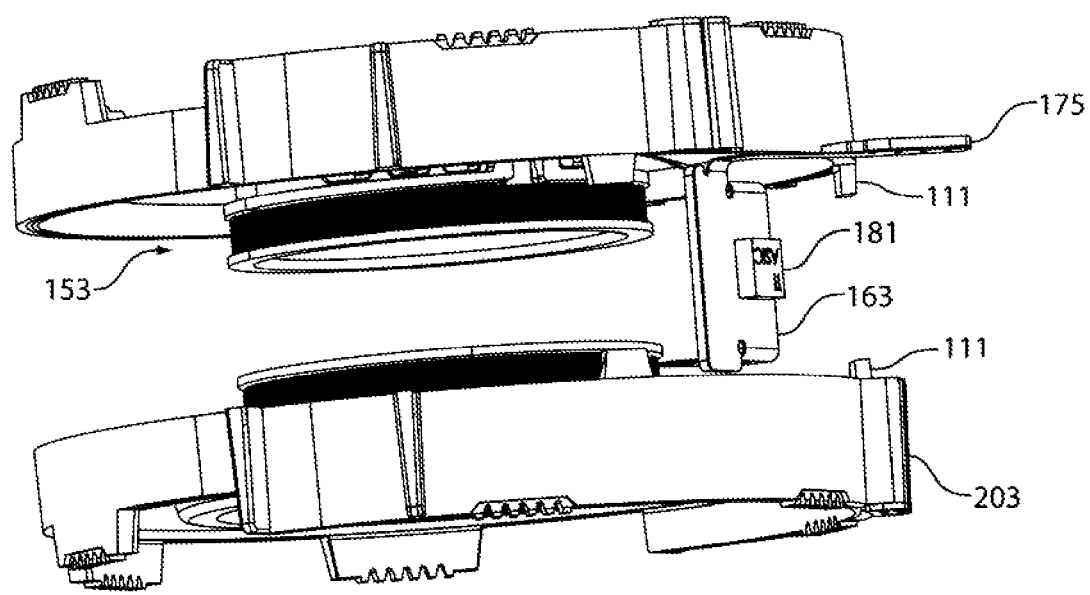
FIG. 39 is a perspective view of the synthetic jet actuator of FIG. 1 with the main chassis removed to show the details of the interior of the device.
Figure 40:
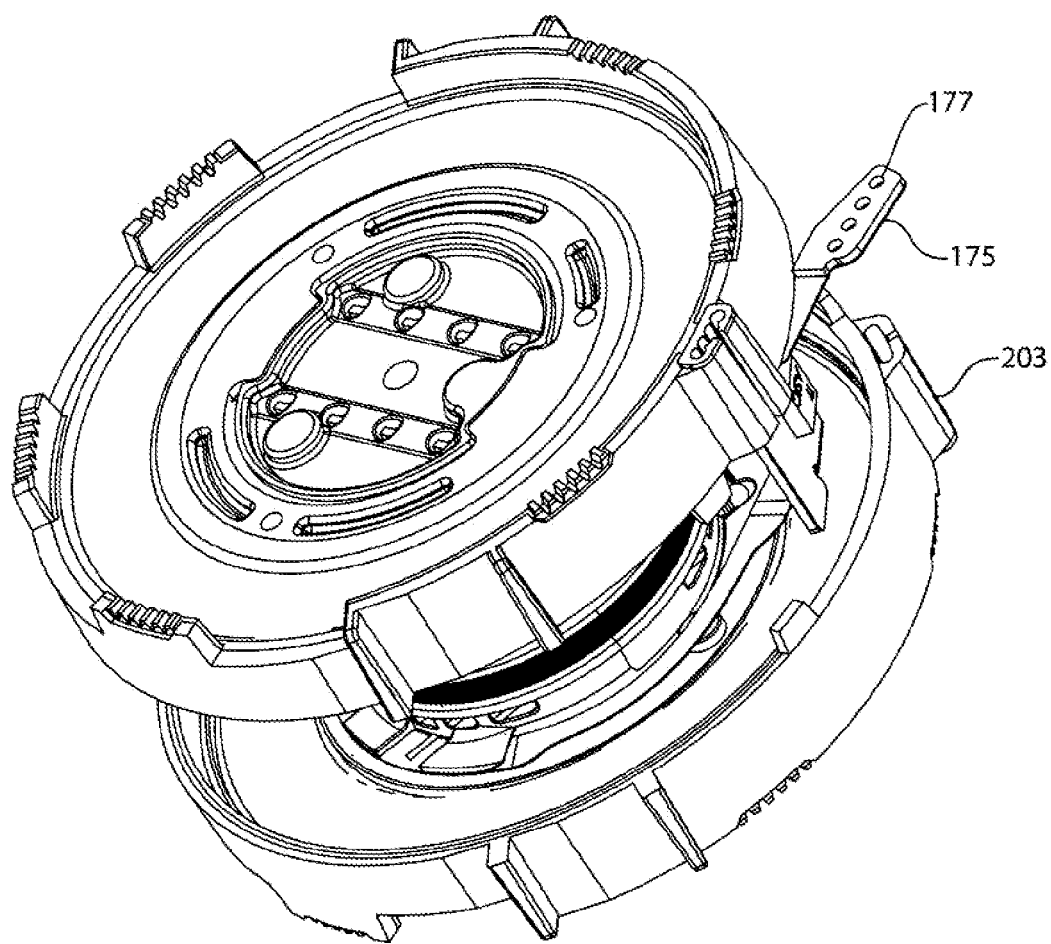
FIG. 40 is a perspective view of the synthetic jet actuator of FIG. 1 with the main chassis removed to show the details of the interior of the device.
Figure 41:
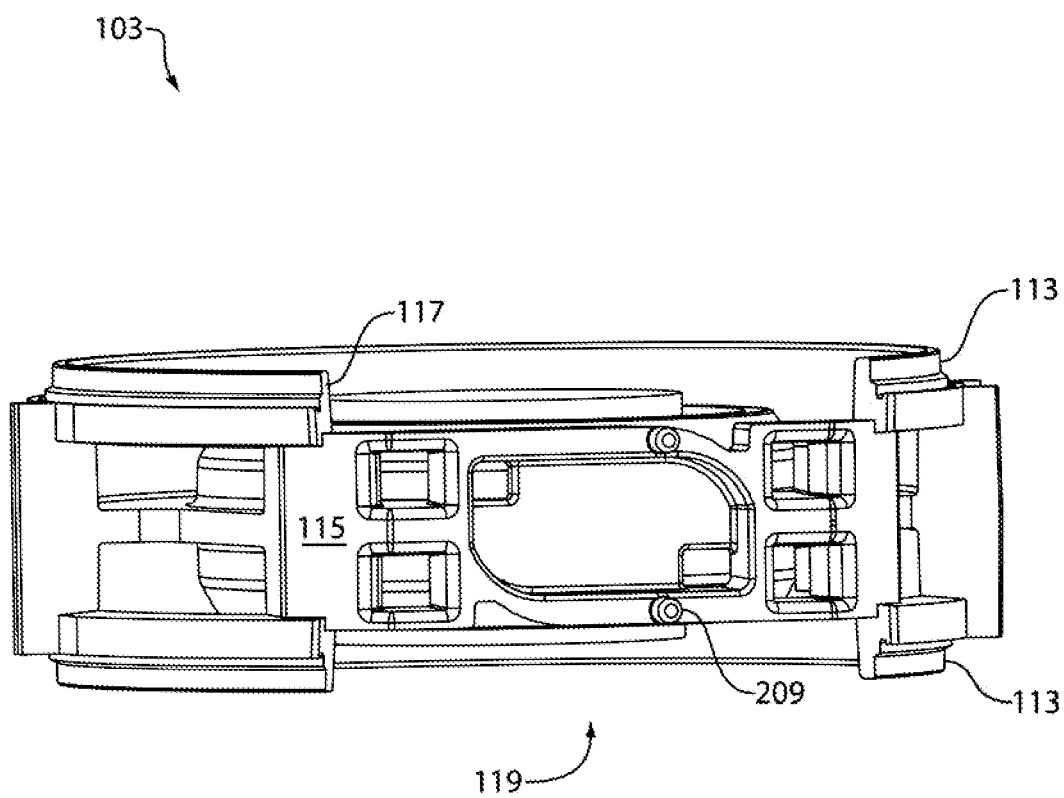
FIG. 41 is a perspective view of the main chassis of a synthetic jet actuator made in accordance with the teachings herein.
Figure 42:
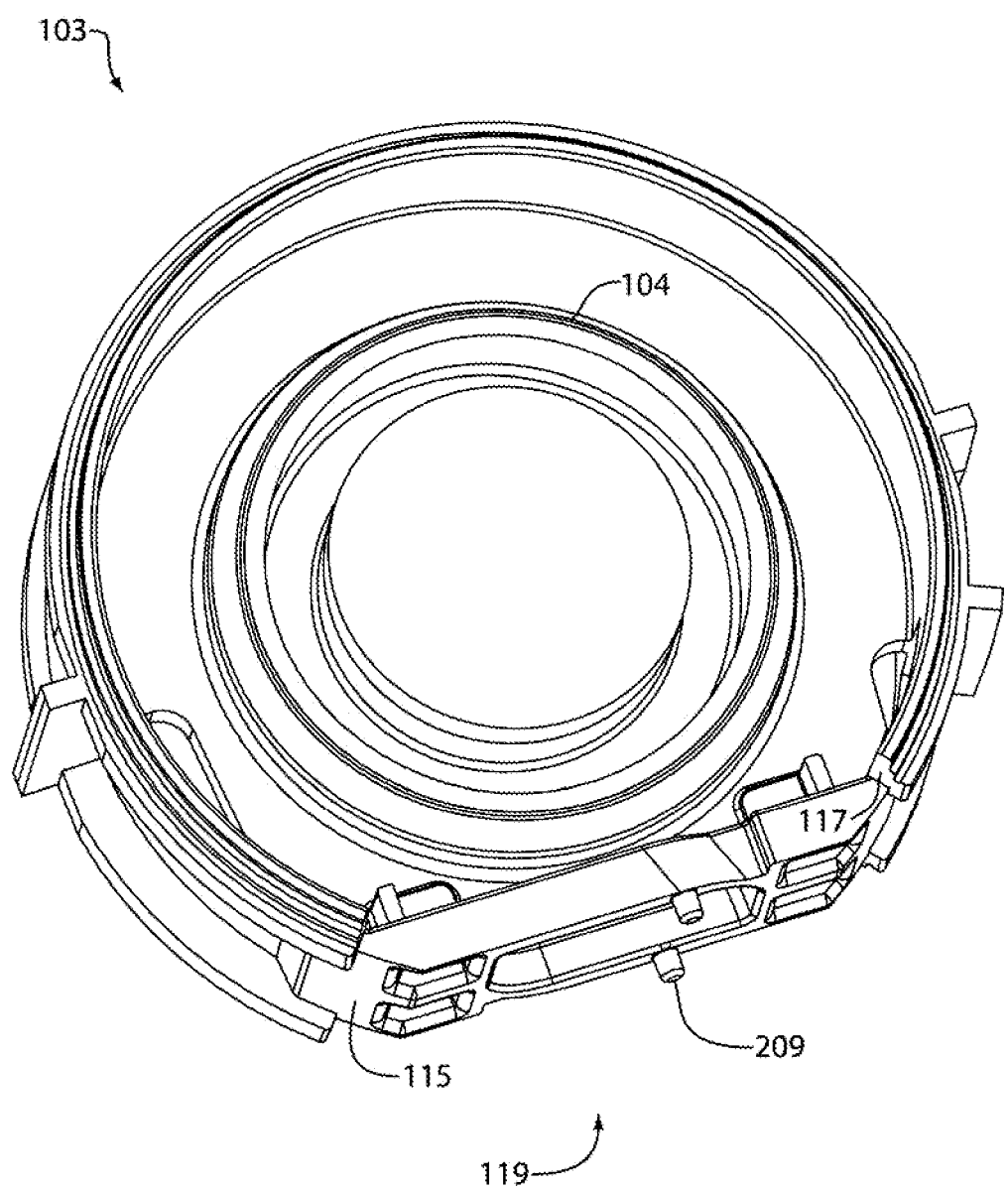
FIG. 42 is a perspective view of the main chassis of a synthetic jet actuator made in accordance with the teachings herein.
Figure 43:
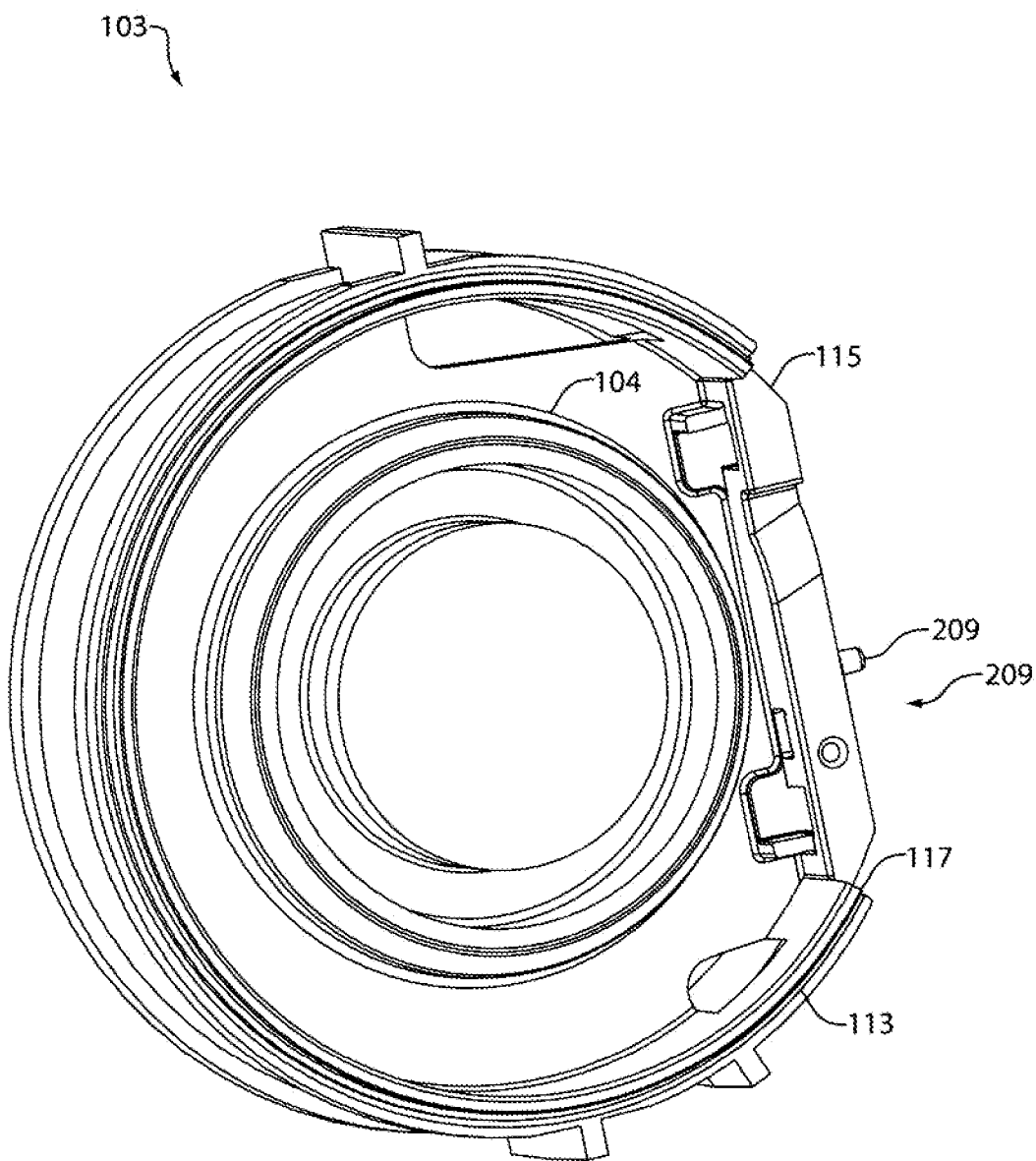
FIG. 43 is a perspective view of the main chassis of a synthetic jet actuator made in accordance with the teachings herein.
Figure 44:
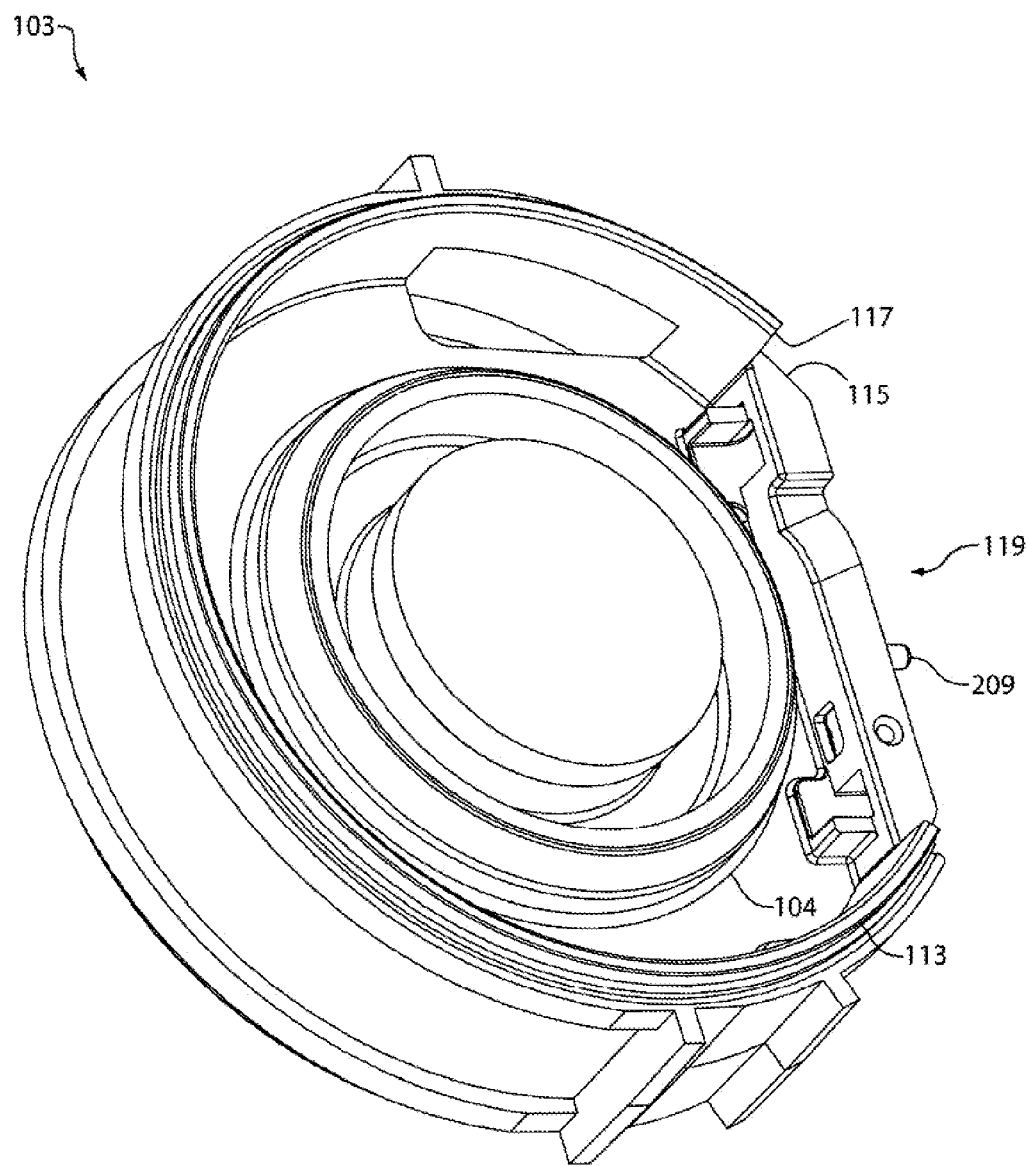
FIG. 44 is a perspective view of the main chassis of a synthetic jet actuator made in accordance with the teachings herein.
Figure 45:
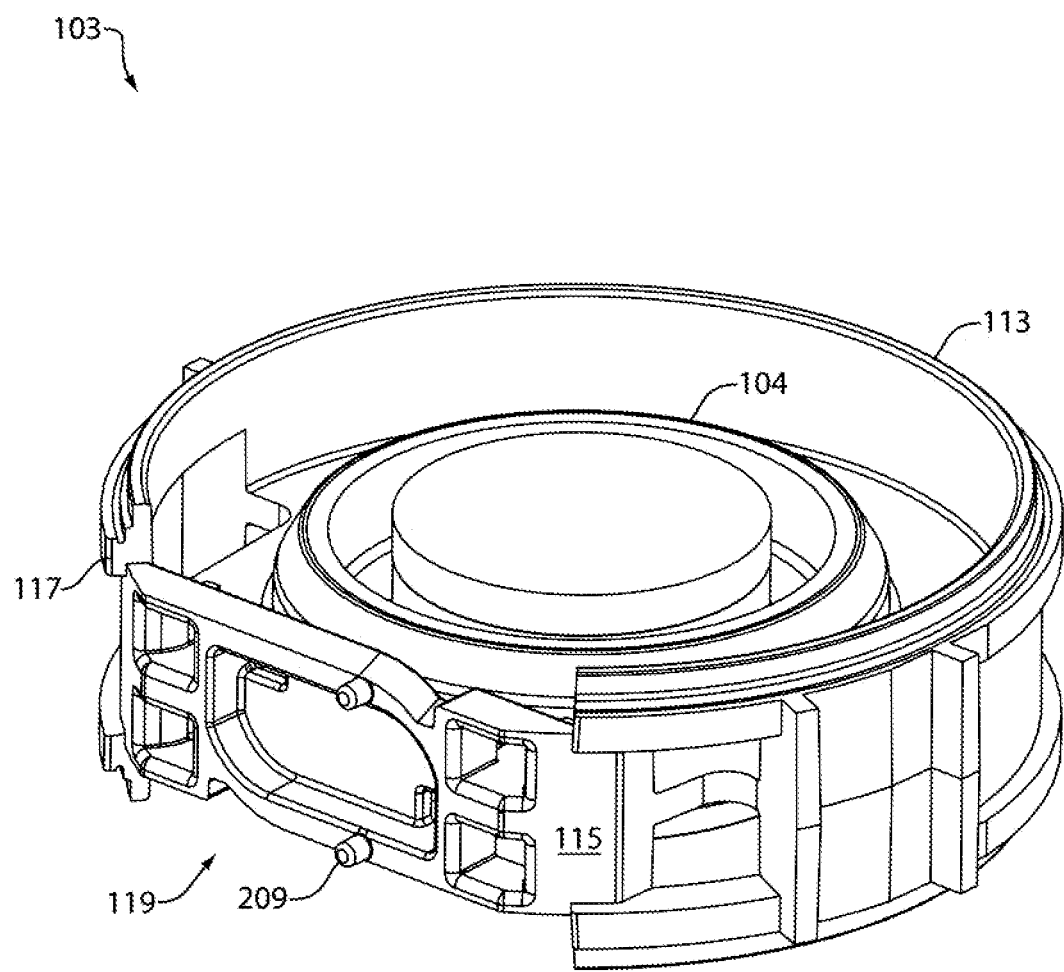
FIG. 45 is a perspective view of the main chassis of a synthetic jet actuator made in accordance with the teachings herein.
Figure 46:
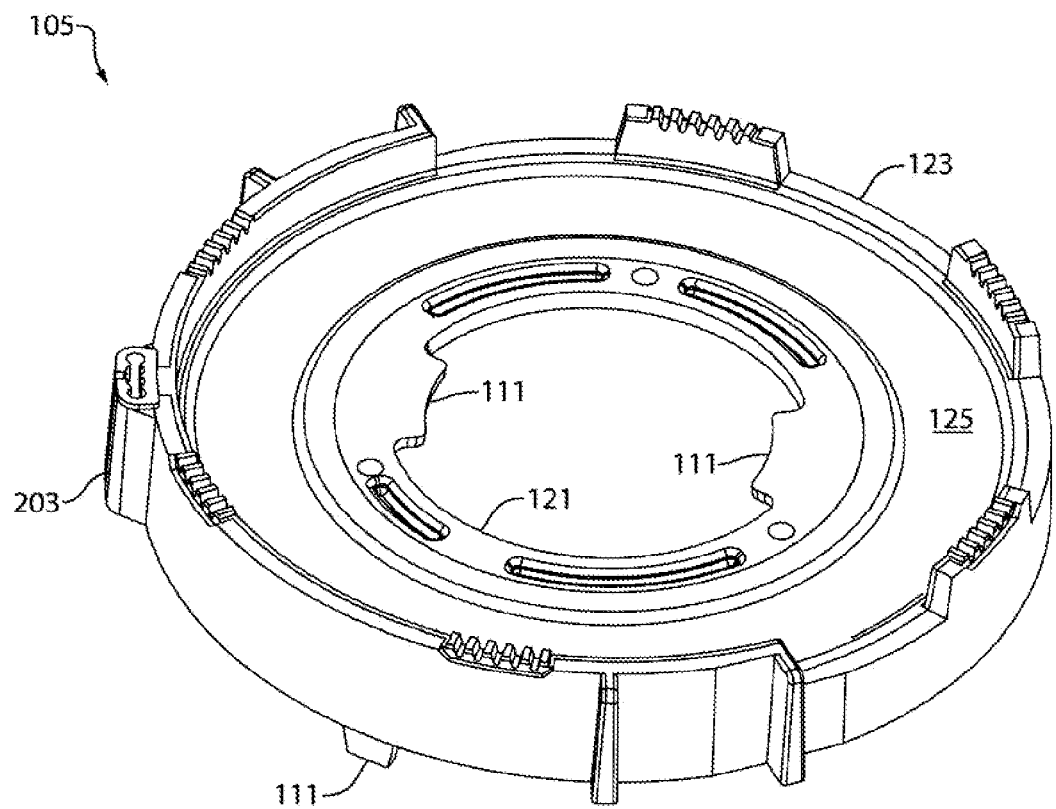
FIG. 46 is a perspective view of an auxiliary chassis component of the synthetic jet actuator of FIG. 1.
Figure 47:
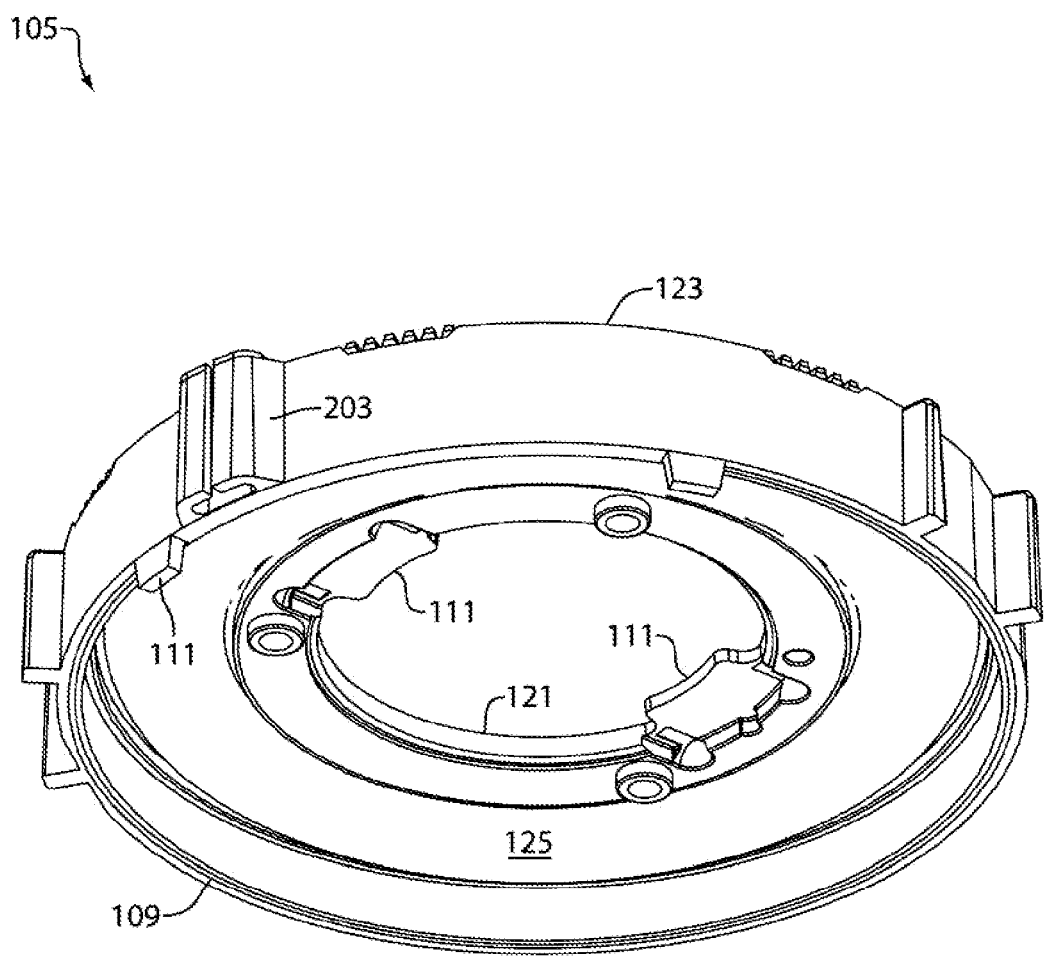
FIG. 47 is a perspective view of an auxiliary chassis component of the synthetic jet actuator of FIG. 1.
Figure 48:
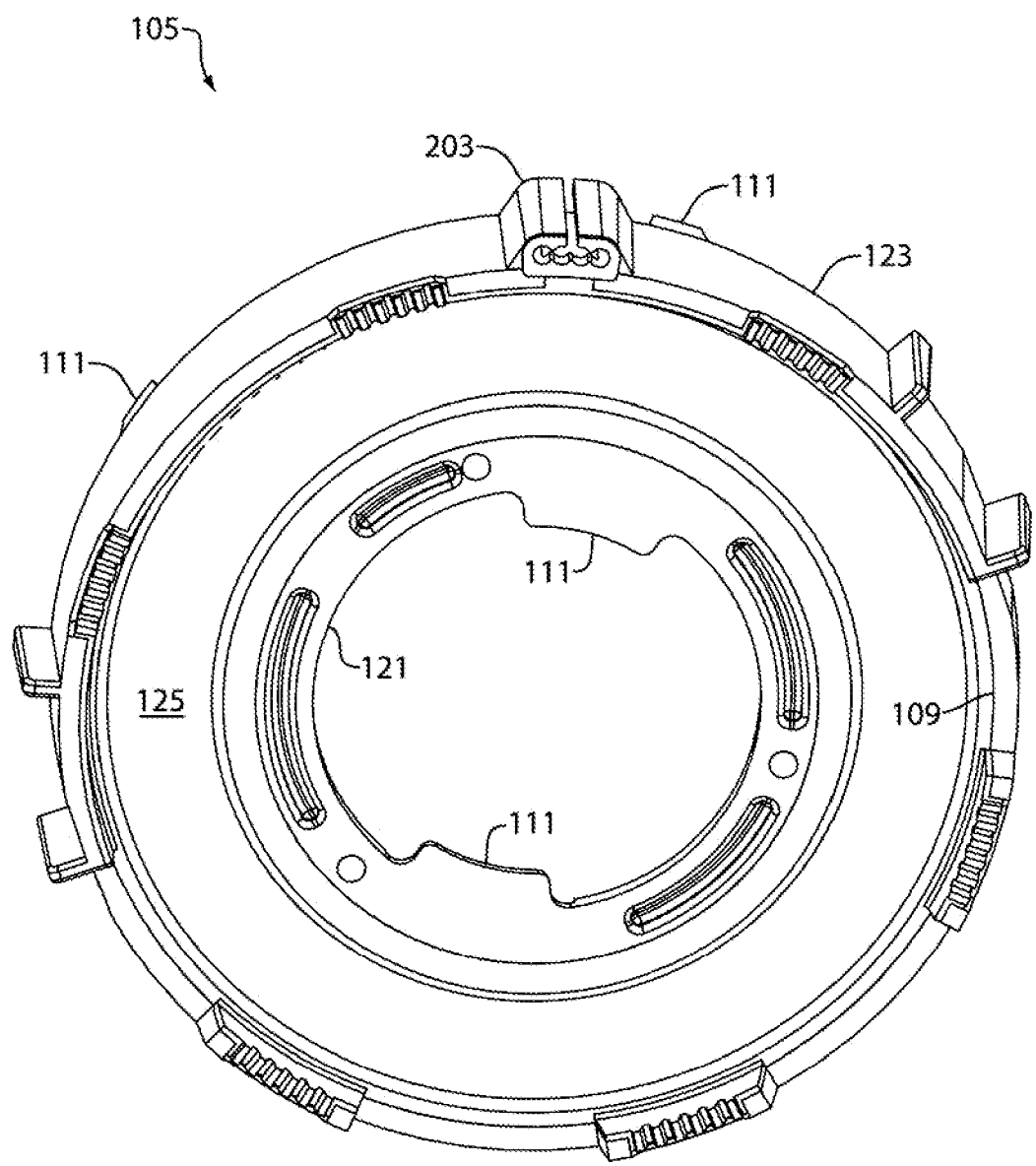
FIG. 48 is a perspective view of an auxiliary chassis component of the synthetic jet actuator of FIG. 1.

The manner in which the connector 161 is incorporated into the synthetic jet actuator 101 may be appreciated with respect to FIGS. 24-29. As best seen in FIGS. 26 and 29, the first terminal portion 169 of the connector 161 is mated with the first 141 and second 145 platform of a first voice coil 131 such that the protrusion 143 on the first platform 141 extends through an aperture 177 in the first terminal portion 169, and such that the protrusion 147 on the second platform 145 extends through another aperture 177 in the first terminal portion 169. The second terminal portion 171 is connected to a second voice coil 131 in a similar manner. The synthetic jet ejector 101 is then assembled as shown in the cross-sectional views of FIGS. 5-6.

Figure 2:
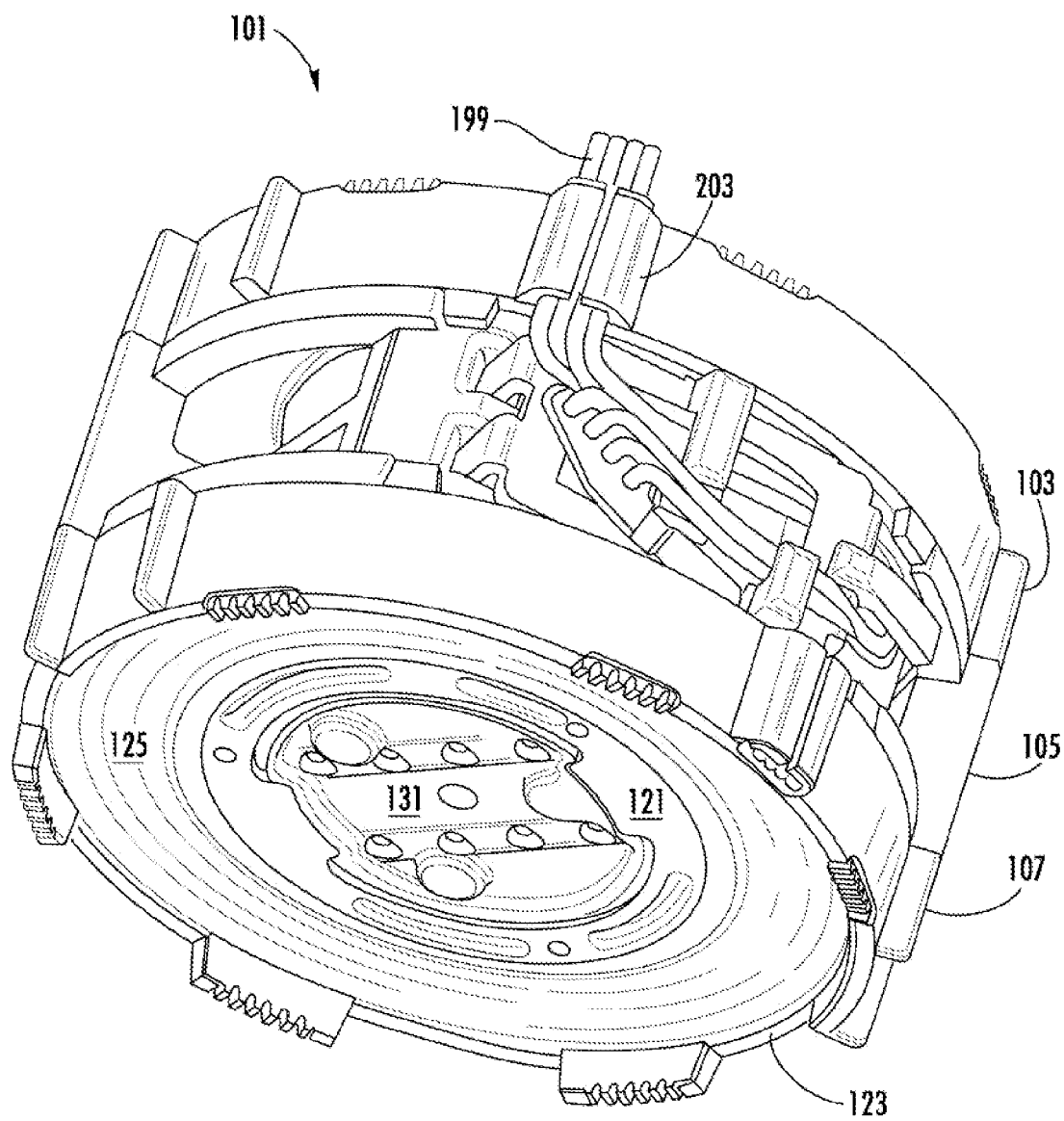
FIG. 2 is a perspective view of a synthetic jet actuator made in accordance with the teachings herein.
Figure 3:
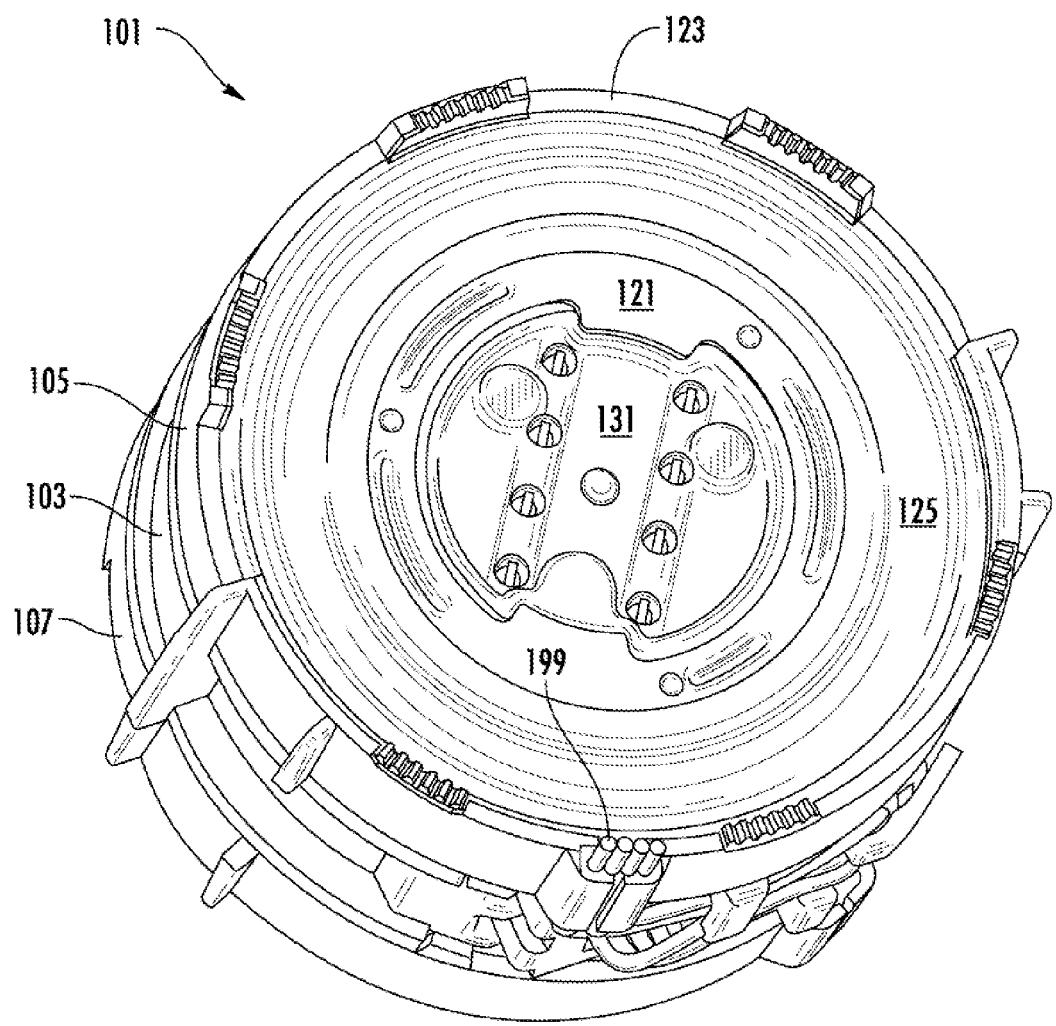
FIG. 3 is a perspective view of a synthetic jet actuator made in accordance with the teachings herein.
Figure 4:
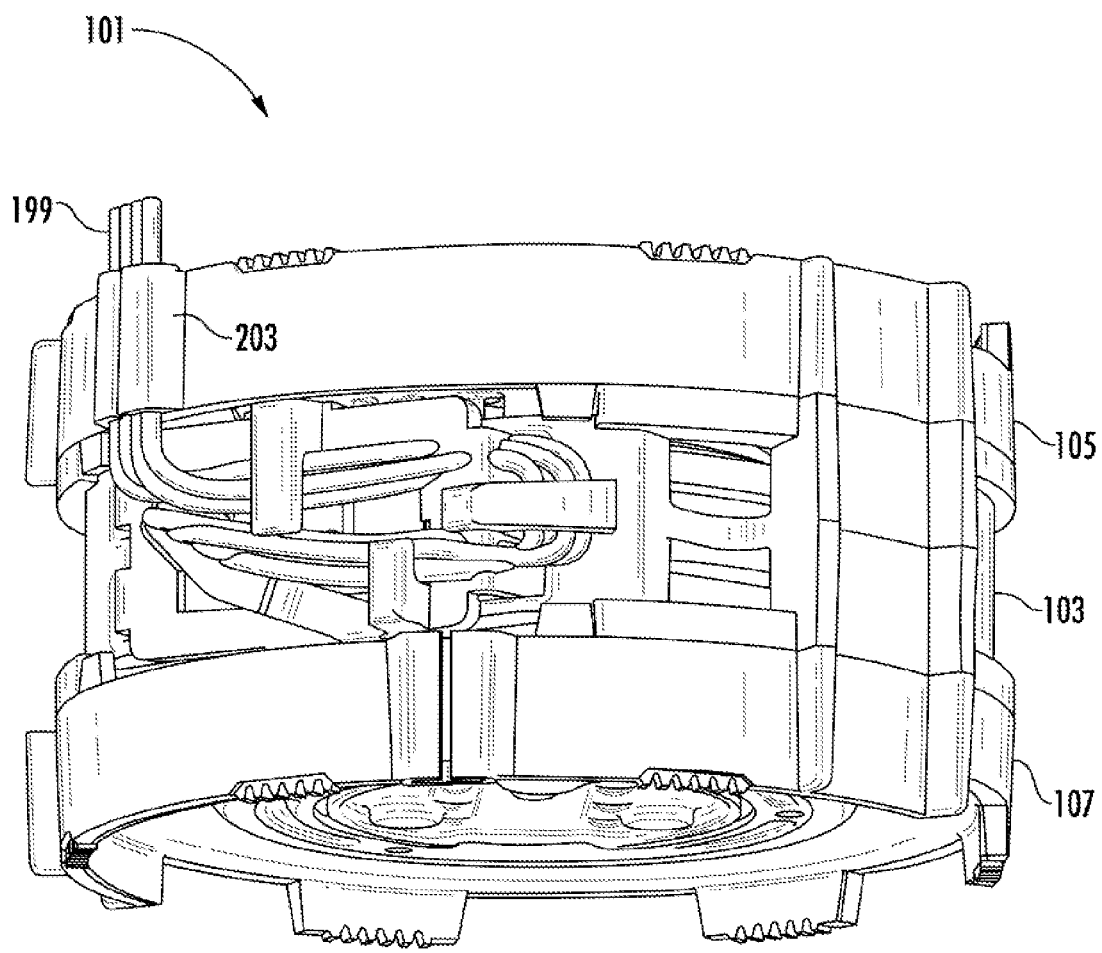
FIG. 4 is a perspective view of a synthetic jet actuator made in accordance with the teachings herein.
Figure 5:
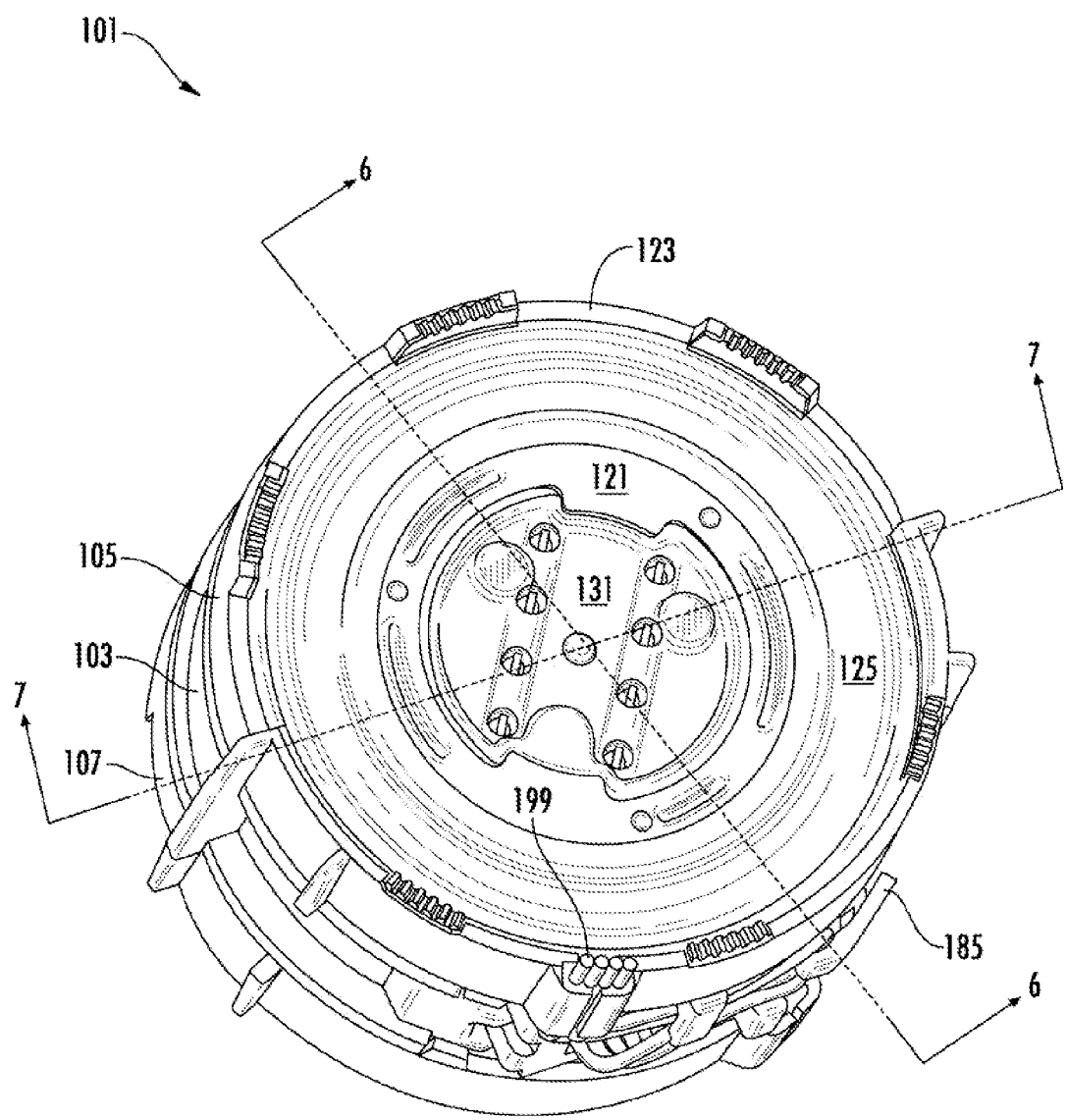
FIG. 5 is a perspective view of a synthetic jet actuator made in accordance with the teachings herein.
Figure 6:
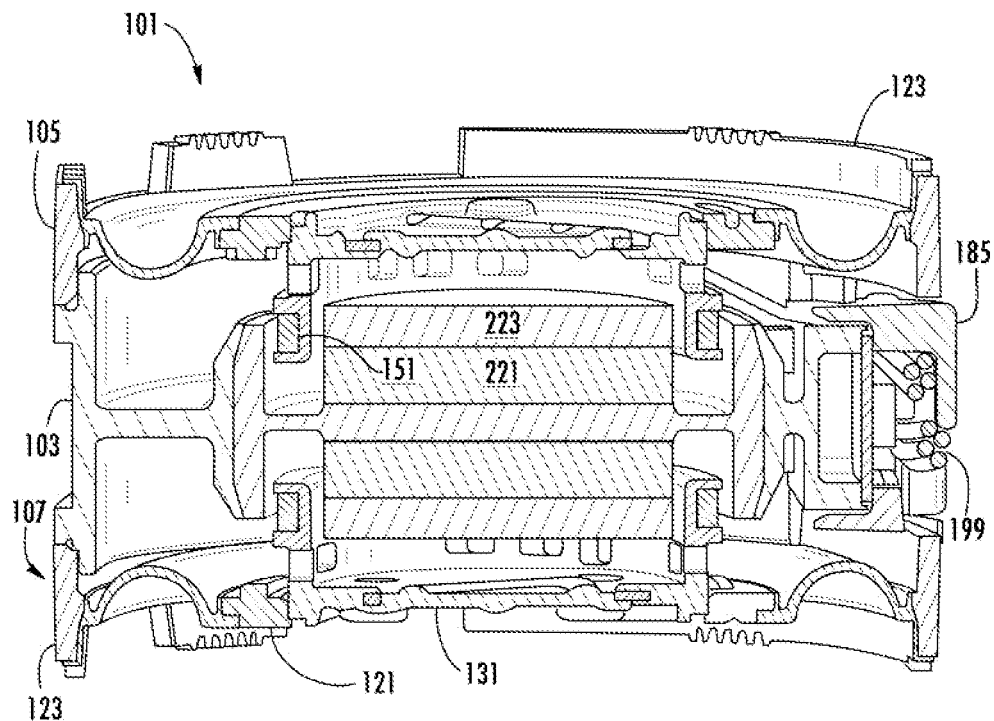
FIG. 6 is a cross-sectional view taken along LINE 4-4 of FIG. 4.
Figure 7:
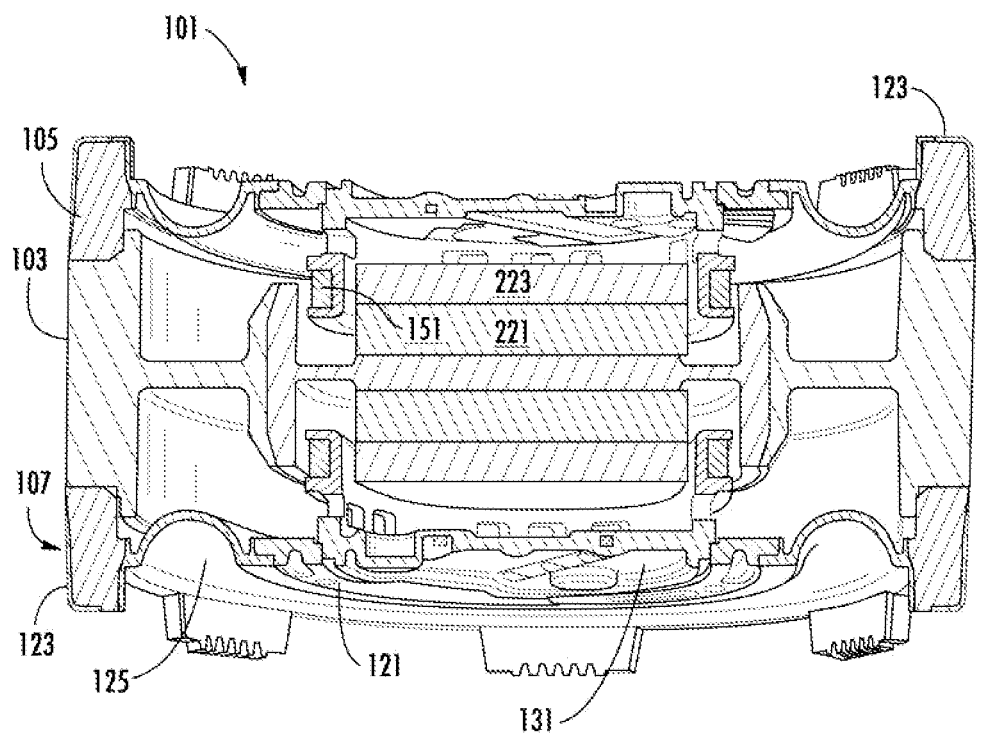
FIG. 7 is a cross-sectional view taken along LINE 6-6 of FIG. 4.
Figure 8:
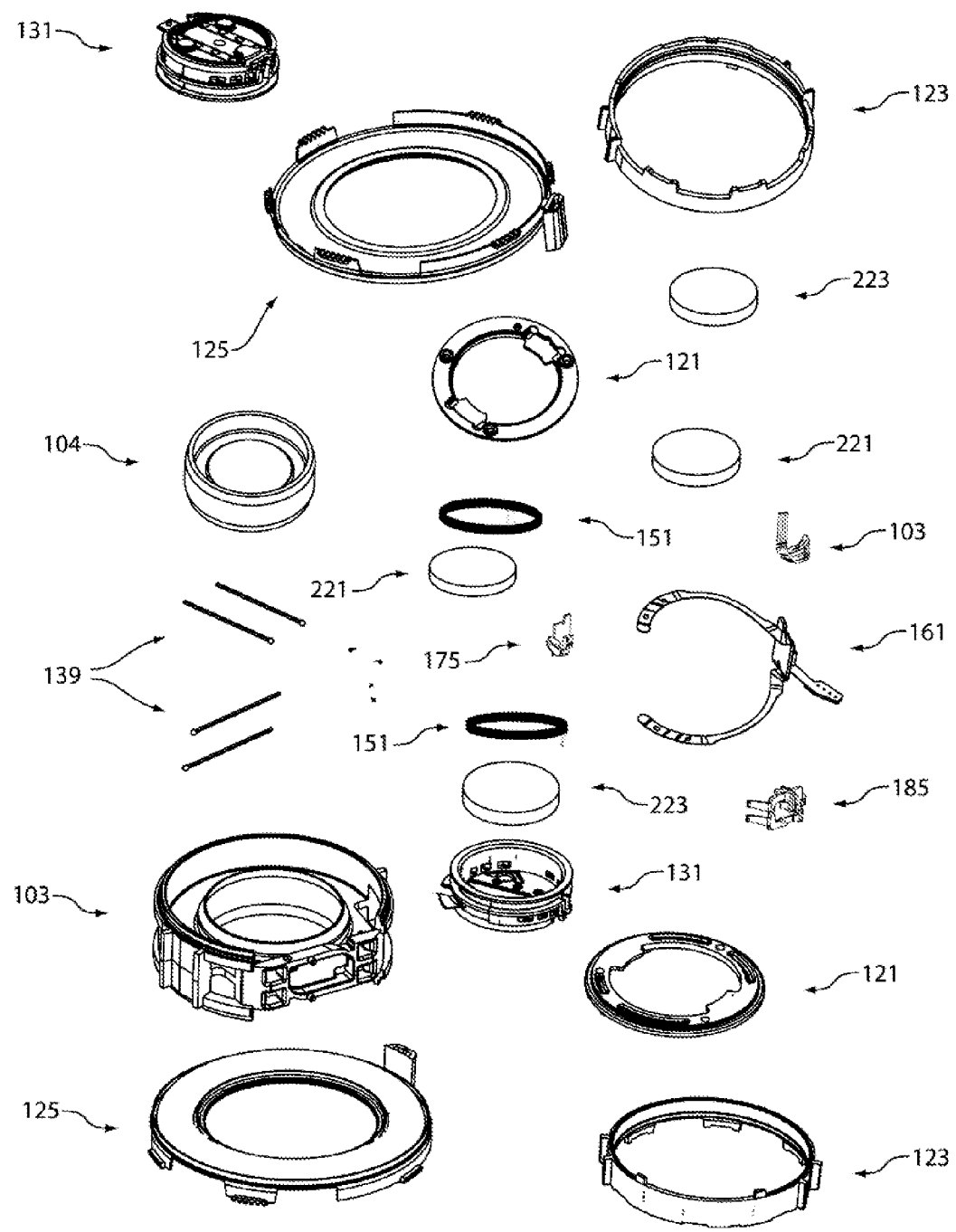
FIG. 8 is an exploded view of the synthetic jet actuator of FIG. 1.

Referring now to FIGS. 1-3, a wire clip 185 is mounted on the wiring manifold 119. As seen in FIGS. 50-55, the wire clip 185 is equipped with four prongs 187, each of which is inserted into one of four corresponding holes 189 provided in the wiring manifold 119 (see, e.g., FIG. 13). Each prong 187 on the wire clip 185 terminates in a hook 191 which catches on the lip of the hole 189 to secure the wire clip 185 in place.

Figure 13:
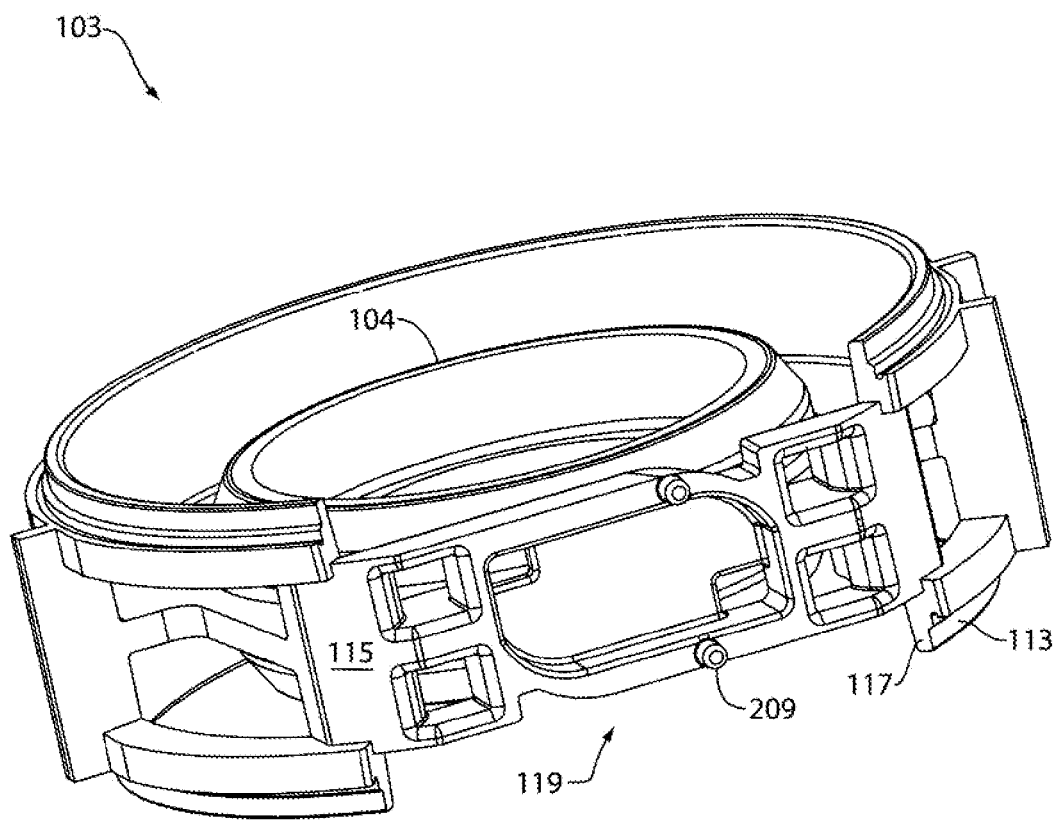
FIG. 13 is a perspective view of the main chassis of a synthetic jet actuator made in accordance with the teachings herein.
Figure 14:
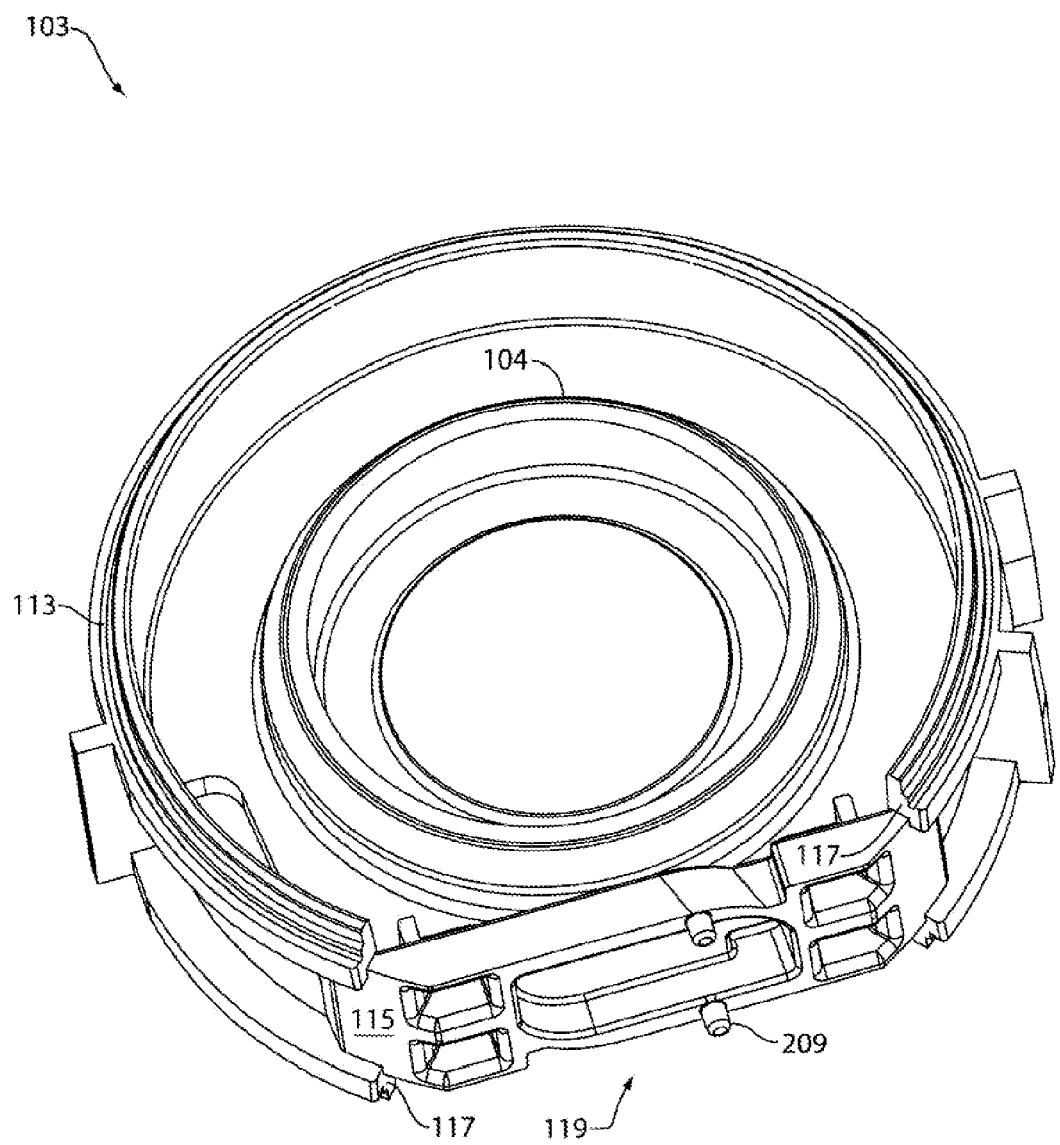
FIG. 14 is a perspective view of the main chassis of a synthetic jet actuator made in accordance with the teachings herein.
Figure 15:
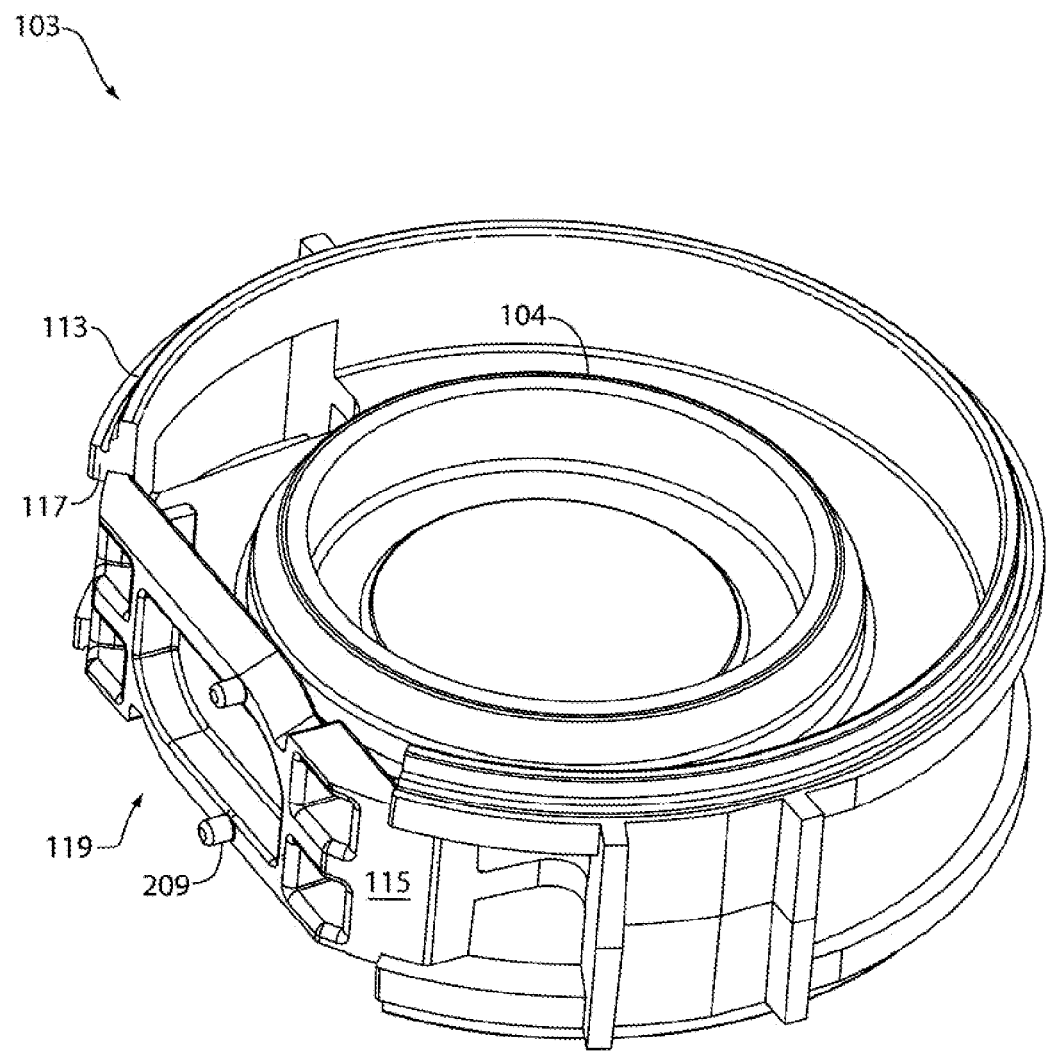
FIG. 15 is a perspective view of the main chassis of a synthetic jet actuator made in accordance with the teachings herein.
Figure 16:
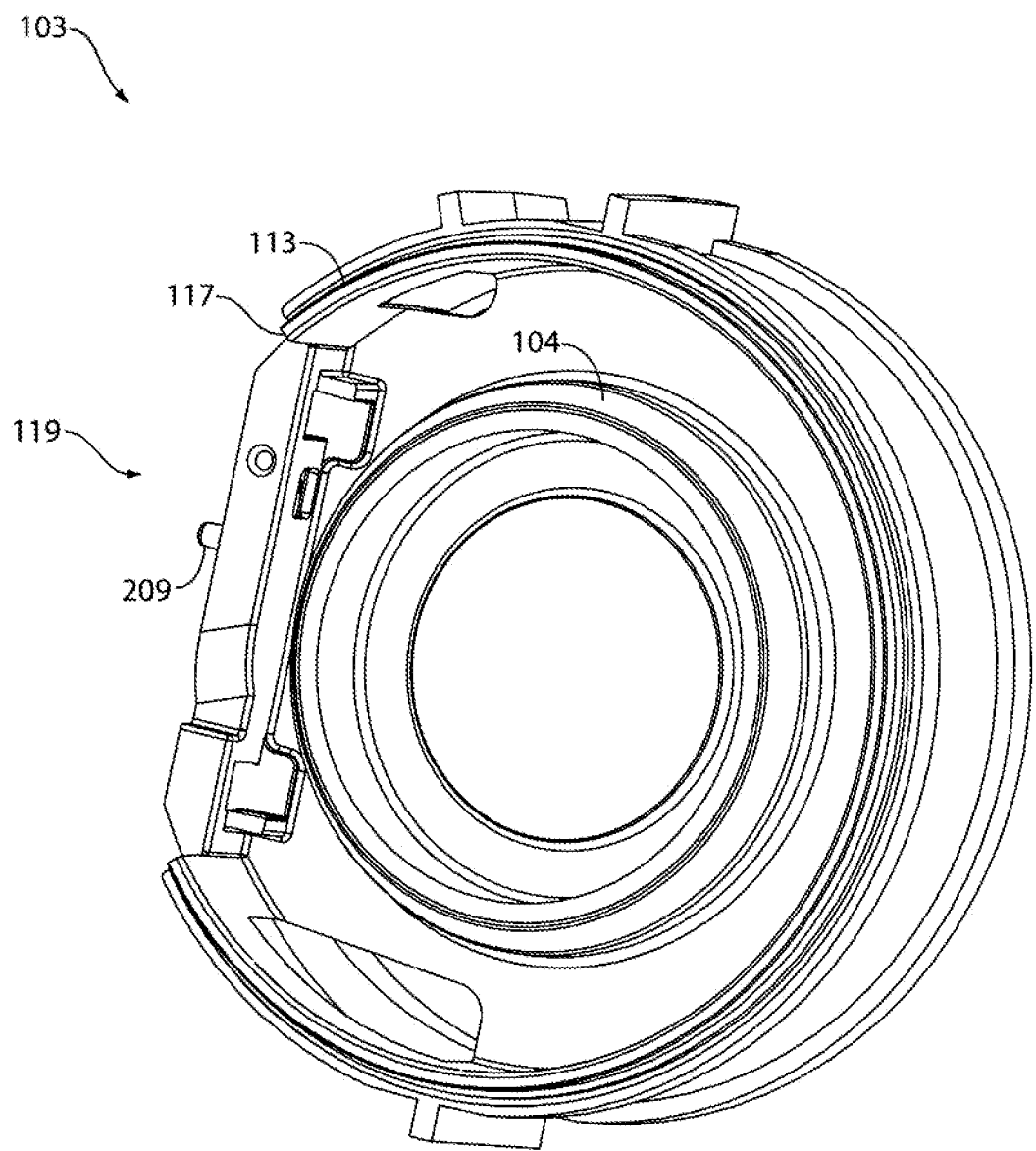
FIG. 16 is a perspective view of the main chassis of a synthetic jet actuator made in accordance with the teachings herein.
Figure 17:
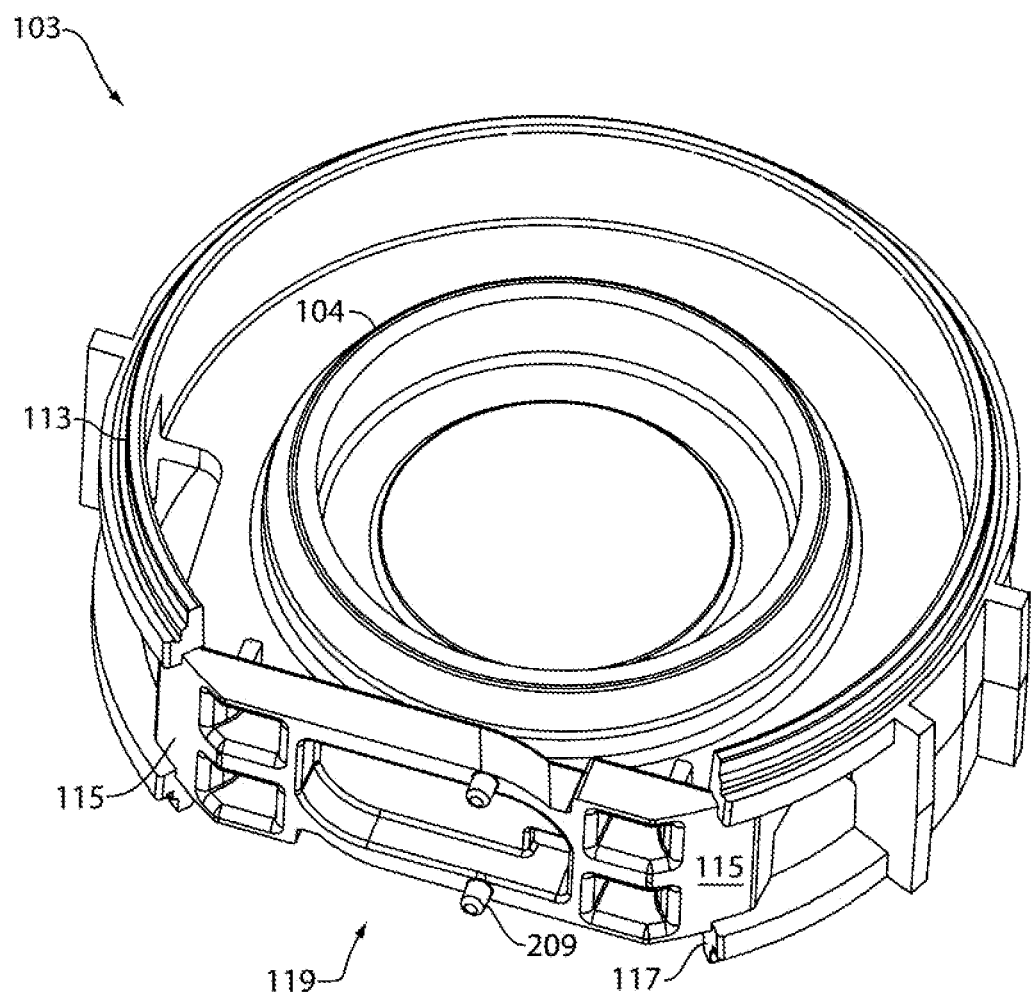
FIG. 17 is a perspective view of the main chassis of a synthetic jet actuator made in accordance with the teachings herein.
Figure 18:
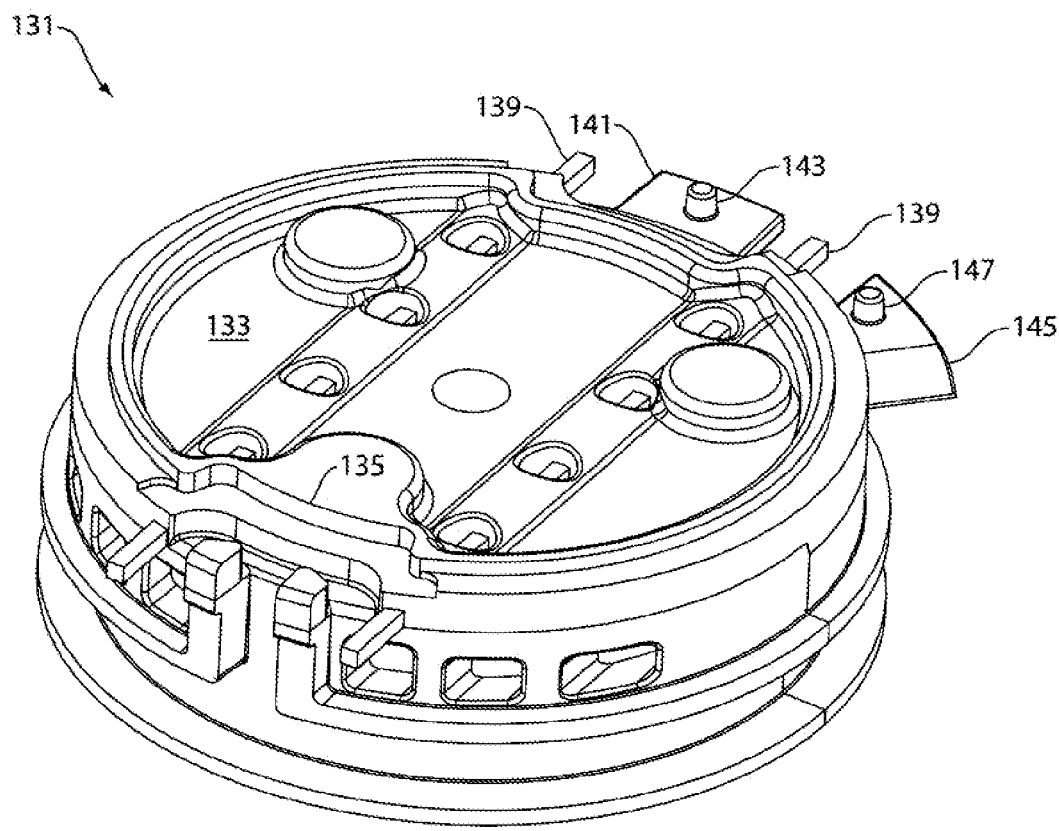
FIG. 18 is a perspective view of a voice coil made in accordance with the teachings herein, but without the wiring.
Figure 19:
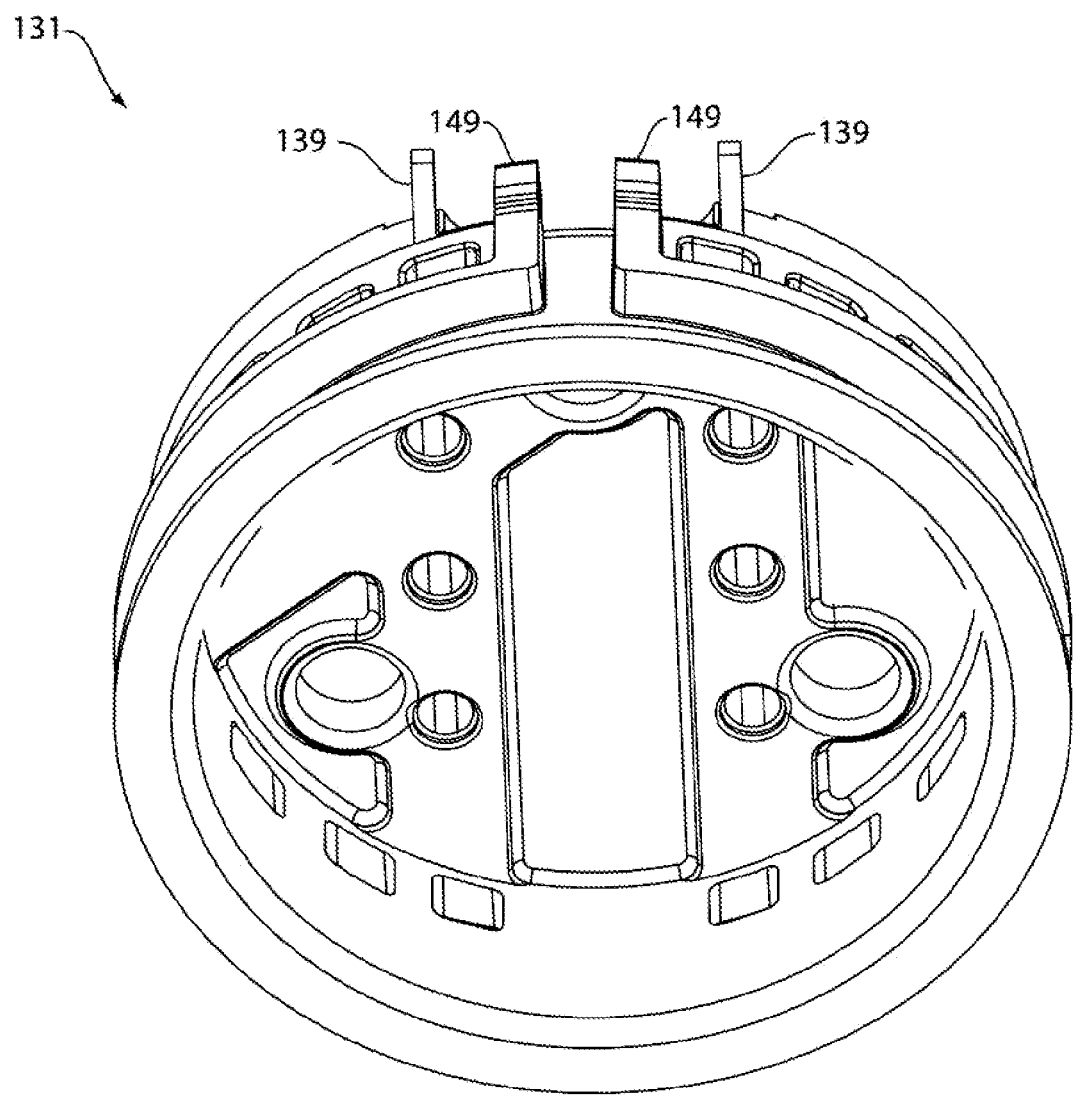
FIG. 19 is a perspective view of a voice coil made in accordance with the teachings herein, but without the wiring.

A set of opposing brackets 201, an essentially rectangular indentation 205, and a set of holes 207 (which mate with corresponding protrusions 209 in the main chassis 103; see, e.g., FIG. 13) are provided to ensure that the wire clip 185 is seated properly over the wiring manifold 119.

The wire clip 185 is further equipped with brackets 193, 195 and 197 (see FIGS. 50-55). As seen in FIGS. 1-3, the terminal ends of wires 199 from an external power source are inserted into the holes 177 of the third terminal portion 175 of the connector 161, thus bringing them into electrical communication with the circuitry disposed in the connector 161. The wires 199 are then wrapped around brackets 191, 193 and 195 in a snug manner, and are fed through conduit 203. This arrangement ensures a low profile for the wires 199, and also prevents them from becoming disconnected if force is applied to them.

Various modifications may be made to the devices and methodologies disclosed herein. For example, the connector 161 may have a variety of shapes and configurations, and may be manufactured in a variety of ways. The shape and dimensions of the connector 161, and the number of terminal portions it contains (if any), may vary in accordance with a number of factors including, for example, the number of voice coils in the synthetic jet actuator.

Similarly, while the synthetic jet actuators depicted herein feature dual opposing voice coils, one skilled in the art will appreciate that these devices may have any desirable number of voice coils, including a single voice coil or more than two voice coils.

It will further be appreciated that the synthetic jet actuators disclosed herein may be disposed in a variety of housings to produce synthetic jet ejectors of varying geometries, dimensions, and functionalities. For example, these housings may be designed to create any desired number of synthetic jets having any desired distribution, directionality, or profile. By way of example, the housing may be equipped with various channels, apertures, nozzles, vents, partitions, or other such features to create synthetic jets or to direct or modify synthetic jets or fluidic flow.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A synthetic jet ejector, comprising:
    first and second voice coil bodies;
    first and second sets of electrically conductive terminals;
    first and second coils of wire coiled around said first and second voice coil bodies, respectively, such that the first coil is in electrical contact with the first set of terminals and such that the second coil is in electrical contact with the second set of terminals; and
    a flexible, electrically conductive connector having first and second ends attached to said first and second voice coil bodies, respectively, wherein the first end of the connector is attached such that it is in electrical contact with the first set of terminals, and wherein the second end of the connector is attached such that it is in electrical contact with the second set of terminals.

2. The synthetic jet ejector of claim 1, wherein the synthetic jet ejector comprises first and second voice coils, wherein said first coil forms a portion of said first voice coil, and wherein said second coil forms a portion of said second voice coil.

3. The synthetic jet ejector of claim 1, wherein the first and second sets of terminals are releasably mated with the first and second sets of channels, respectively.

4. The synthetic jet ejector of claim 3, wherein the first set of terminals has first and second members, wherein a first end of the first coil is wrapped around the first member adjacent to the bulbous protrusion thereon, and wherein a second end of the first coil is wrapped around the second member adjacent to the bulbous protrusion thereon.

5. The synthetic jet ejector of claim 4, wherein the first and second voice coil bodies are generally cylindrical in shape, and wherein the first and second terminals are arranged in parallel and extend across the diameter of the cylinder.

6. The synthetic jet ejector of claim 4, wherein the second end of the longitudinal body of each of the first and second members is in electrical contact with a first end of the connector.

7. The synthetic jet ejector of claim 3, wherein the second set of terminals has first and second members, wherein a first end of the second coil is wrapped around the first member of the second set adjacent to the bulbous protrusion thereon, and wherein a second end of the second coil is wrapped around the second member of the second set adjacent to the bulbous protrusion thereon.

8. The synthetic jet ejector of claim 7, wherein the second end of the longitudinal body of each of the first and second members of the second set is in electrical contact with a second end of the connector.

9. The synthetic jet ejector of claim 1, wherein each member of the first and second sets of terminals has a longitudinal body which terminates on a first end in a bulbous protrusion.

10. The synthetic jet ejector of claim 1, wherein the connector has a chip disposed on a surface thereof which controls the operation of the first and second voice coils.

11. The synthetic jet ejector of claim 1, wherein the connector has a terminal plate disposed thereon, and wherein an external power supply cable is connected to the terminal plate.

12. The synthetic jet ejector of claim 1, wherein said connector comprises:
    a central portion having a semiconductor device disposed thereon which is adapted to control the operation of the first and second electromagnetic coils; and
    first and second flexible arms depending from said central portion, wherein said first arm terminates in a first tab which releasably attaches to said first coil, and wherein said second arm terminates in a second tab which releasably attaches to said second coil.

13. The synthetic jet ejector of claim 12, further comprising a third tab connected to said central portion, said third tab being adapted to mate with an external power source.

14. The synthetic jet ejector of claim 13, wherein said third tab is equipped with a plurality of apertures, and wherein each of said plurality of apertures is adapted to releasably engage a terminal portion of a wire.

15. The synthetic jet ejector of claim 12, wherein said first and second arms are arcuate.

16. The synthetic jet ejector of claim 12, wherein said central portion and said first and second arms comprise an electrically conductive material.

17. The synthetic jet ejector of claim 16, wherein said semiconductor device is in electrical communication with said first and second tabs.

18. The synthetic jet ejector of claim 12, wherein said electrical connector is cut from a planar sheet of material.

19. The synthetic jet ejector of claim 1, wherein said first and second voice coil bodies have first and second sets of channels defined therein, respectively, and wherein said first and second sets of electrically conductive terminals disposed in the first and second sets of channels, respectively.

20. The synthetic jet ejector of claim 1, wherein said connector comprises a central portion having a control device disposed on a surface thereof which controls the operation of the first and second voice coils, and first and second arms which extend from said central portion, wherein said control device is in electrical communication with said first voice coil by way of said first arm, and wherein said control device is in electrical communication with said second voice coil by way of said second arm.

21. The synthetic jet ejector of claim 20, wherein said connector further comprises a third arm which is in electrical communication with said central portion and with an external power source.

22. The synthetic jet ejector of claim 1, wherein said connector comprises a material selected from the group consisting of polyesters, polyimides and polyether ether ketones.

23. The synthetic jet ejector of claim 22, wherein said connector has circuitry defined thereon.

24. The synthetic jet ejector of claim 22, wherein said circuitry is formed through screen printing.

\* \* \* \* \*